United States Patent
Saito et al.

(10) Patent No.: US 9,605,209 B2
(45) Date of Patent: *Mar. 28, 2017

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,221

(22) Filed: Jan. 13, 2015

(65) Prior Publication Data

US 2015/0299575 A1    Oct. 22, 2015

(30) Foreign Application Priority Data

Apr. 21, 2014  (JP) .................................. 2014-087418
Oct. 9, 2014  (JP) .................................. 2014-207732

(51) Int. Cl.
| | | |
|---|---|---|
| G02F 1/1333 | (2006.01) | |
| C09K 19/34 | (2006.01) | |
| C09K 19/04 | (2006.01) | |
| C09K 19/12 | (2006.01) | |
| C09K 19/30 | (2006.01) | |

(52) U.S. Cl.
CPC .. C09K 19/3402 (2013.01); *C09K 2019/0448* (2013.01); *C09K 2019/122* (2013.01); *C09K 2019/123* (2013.01); *C09K 2019/3004* (2013.01); *C09K 2019/3422* (2013.01); *C09K 2019/3425* (2013.01)

(58) Field of Classification Search
CPC ........ C09K 19/3402; C09K 2019/3422; C09K 2019/3425; C09K 2019/0488; C09K 2019/122; C09K 2019/123; C09K 2019/3004; G02F 1/1333
USPC .............. 252/299.01, 299.6, 299.61, 299.62, 252/299.63; 349/182
See application file for complete search history.

(56) References Cited

U.S. PATENT DOCUMENTS

| | | | |
|---|---|---|---|
| 6,558,758 B1 | 5/2003 | Yanai et al. | |
| 7,081,279 B2 * | 7/2006 | Kato .................... | C07C 17/2635 252/299.61 |
| 8,158,219 B2 * | 4/2012 | Hattori .................. | C09K 19/12 252/299.61 |
| 8,206,610 B2 * | 6/2012 | Hattori ............... | C09K 19/3402 252/299.01 |
| 8,273,421 B2 * | 9/2012 | Saito ................... | C09K 19/3003 252/299.61 |
| 8,343,596 B2 * | 1/2013 | Hattori ............... | C09K 19/3001 252/299.61 |
| 8,586,152 B2 * | 11/2013 | Furusato .............. | C09K 19/126 252/299.5 |
| 8,821,993 B2 * | 9/2014 | Hattori ............... | C09K 19/3066 252/299.61 |
| 8,932,484 B2 * | 1/2015 | Hattori .................. | C09K 19/12 252/299.61 |
| 2004/0065866 A1 | 4/2004 | Kato et al. | |
| 2008/0230746 A1 | 9/2008 | Kibe et al. | |
| 2008/0303001 A1 | 12/2008 | Hattori et al. | |
| 2009/0324854 A1 | 12/2009 | Masukawa | |
| 2011/0109867 A1 | 5/2011 | Hattori et al. | |
| 2011/0278501 A1 | 11/2011 | Hattori et al. | |
| 2012/0181478 A1 | 7/2012 | Hattori et al. | |
| 2013/0062559 A1 | 3/2013 | Hattori et al. | |
| 2013/0207039 A1 | 8/2013 | Hattori et al. | |

FOREIGN PATENT DOCUMENTS

| | | |
|---|---|---|
| JP | 2000-053602 | 2/2000 |
| JP | 2001-115161 | 4/2001 |
| WO | 2008/114779 | 9/2008 |
| WO | 2008/114821 | 9/2008 |
| WO | 2009/157313 | 12/2009 |
| WO | 2010/016387 | 2/2010 |
| WO | 2010/084810 | 7/2010 |
| WO | 2011/040170 | 4/2011 |
| WO | 2011/152494 | 12/2011 |
| WO | 2012/053323 | 4/2012 |

* cited by examiner

*Primary Examiner* — Geraldina Visconti
(74) *Attorney, Agent, or Firm* — Jianq Chyun IP Office

(57) ABSTRACT

A liquid crystal composition and an AM LCD device containing the same are described. The liquid crystal composition has a negative dielectric anisotropy, contains a specific compound having a negatively large dielectric anisotropy in a specific range of proportion as a first component, and a specific compound having a small viscosity as a second component, and may also contain a specific compound having a high maximum temperature or a small viscosity as a third component, a specific compound having a negative dielectric anisotropy as a fourth component, and/or a specific compound having a polymerizable group as an additive component.

20 Claims, No Drawings

LIQUID CRYSTAL COMPOSITION AND LIQUID CRYSTAL DISPLAY DEVICE

CROSS-REFERENCE TO RELATED APPLICATION

This application claims the priority benefits of Japanese application serial no. 2014-087418, filed on Apr. 21, 2014, and Japanese application serial no. 2014-207732, filed on Oct. 9, 2014. The entirety of each of the above-mentioned patent applications is hereby incorporated by reference herein and made a part of this specification.

TECHNICAL FIELD

The invention relates to a liquid crystal composition, a liquid crystal display (LCD) device including the composition, and so forth, particularly relates to a liquid crystal composition having a negative dielectric anisotropy, and an LCD device that includes the composition and has a mode such as IPS, VA, FFS or FPA, and further relates to an LCD device of a polymer sustained alignment (PSA) mode.

BACKGROUND ART

For LCD devices, a classification based on the operating mode of liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on the driving mode of the device includes passive matrix (PM) type and active matrix (AM) type. The PM type is further classified into static type, multiplex type and so forth, and the AM type is classified into thin film transistor (TFT) type, metal insulator metal (MIM) type and so on. The TFT type is further classified into amorphous silicon type and polysilicon type. The latter is classified into a high temperature type and a low temperature type according to the production process. A classification based on the light source includes a reflective type utilizing natural light, a transmissive type utilizing a backlight and a transflective type utilizing both the natural light and the backlight.

The LCD device includes a liquid crystal composition having a nematic phase. The composition has suitable characteristics. An AM device having good characteristics can be obtained by improving the characteristics of the composition. Table 1 below summarizes a relationship between the characteristics of the two aspects. The characteristics of the composition will be further described based on a commercially available AM device. The temperature range of the nematic phase relates to the temperature range in which the device can be used. A preferred maximum temperature of the nematic phase is about 70° C. or higher and a preferred minimum temperature of the nematic phase is about −10° C. or lower. The viscosity of the composition relates to the response time of the device. A short response time is preferred for displaying moving images on the device. A shorter response time even by one millisecond is desirable. Accordingly, a small viscosity of the composition is preferred. A small viscosity at a low temperature is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption, Large contrast ratio |
| 5 | Large specific resistance | Large voltage holding ratio and large contrast ratio |
| 6 | High stability to UV light and heat | Long service life |

The optical anisotropy of the composition relates to the contrast ratio of the device. According to the mode of the device, a large optical anisotropy or a small optical anisotropy, namely a suitable optical anisotropy, is required. The product ($\Delta n \times d$) of the optical anisotropy ($\Delta n$) of the composition and the cell gap (d) of the device is designed so as to maximize the contrast ratio. A suitable value of the product depends on the type of the operating mode. The value is in the range of about 0.30 μm to about 0.40 μm in a device of the VA mode, and in the range of about 0.20 μm to about 0.30 μm in a device of the IPS or FFS mode. In the above cases, a composition having a large $\Delta n$ is preferred for a device having a small cell gap. A large dielectric anisotropy ($\Delta \in$) of the composition contributes to a low threshold voltage, a small electric power consumption and a large contrast ratio of the device. Accordingly, a large $\Delta \in$ is preferred. A large specific resistance of the composition contributes to a large voltage holding ratio and a large contrast ratio of the device. Accordingly, a composition having a large specific resistance at room temperature and also at a high temperature in an initial stage is preferred. A composition having a large specific resistance at room temperature and also at a high temperature even after the device has been used for a long period of time is preferred. Stability of the composition to UV light and heat relates to a service life of the device. In the case where the stability is high, the device has a long service life. Such characteristics are preferred for an AM device for use in a liquid crystal projector, a liquid crystal television and so forth.

A liquid crystal composition containing a polymer is used for a PSA-mode LCD device. First, a composition to which a small amount of a polymerizable compound is added is injected into a device. Next, the composition is irradiated with UV light, while voltage is applied between substrates of the device, to polymerize the polymerizable compound and produce a polymer network structure in the composition. In the composition, alignment of liquid crystal molecules can be controlled by the polymer. Thus, the response time of the device is shortened and image persistence is improved. Such an effect of the polymer can be expected for the device that has the mode such as TN, ECB, OCB, IPS, VA, FFS or FPA.

A composition having a positive $\Delta \in$ is used for an AM device of the TN mode. A composition having a negative $\Delta \in$ is used for an AM device of the VA mode. A composition having a positive or negative $\Delta \in$ is used for an AM device of the IPS or FFS mode. A composition having a positive or negative $\Delta \in$ is used for a PSA-mode AM device. Examples of the liquid crystal composition having a negative $\Delta \in$ are disclosed in Patent literature Nos. 1 to 10 described below. Patent literature No. 1: JP 2000-53602 A.

Patent literature No. 2: JP 2001-115161 A.
Patent literature No. 3: WO 2008/114821 A.
Patent literature No. 4: WO 2009/157313 A.
Patent literature No. 5: WO 2010/16387 A.
Patent literature No. 6: WO 2010/84810 A.
Patent literature No. 7: WO 2011/40170 A.
Patent literature No. 8: WO 2011/152494 A.
Patent literature No. 9: WO 2012/53323 A.
Patent literature No. 10: WO 2008/114779 A.

SUMMARY OF INVENTION

The invention provides a liquid crystal composition that satisfies at least one of characteristics such as a high maximum temperature of a nematic phase, a low minimum temperature of the nematic phase, a small viscosity, a suitable optical anisotropy, a large negative dielectric anisotropy, a large specific resistance, a high stability to UV light and a high stability to heat, or has a suitable balance regarding at least two of the characteristics. The invention further provides an LCD device including such a composition. The invention additionally provides an AM device having characteristics such as a short response time, a large voltage holding ratio, a low threshold voltage, a large contrast ratio, and a long service life.

The invention concerns a liquid crystal composition that has a negative dielectric anisotropy and contains at least one compound selected from the group consisting of compounds represented by formula (1) as a first component and at least one compound selected from the group consisting of compounds represented by formula (2) as a second component, wherein the proportion of the first component is in the range of 10 wt % to 40 wt % based on the weight of the liquid crystal composition. The invention also concerns an LCD device including the composition.

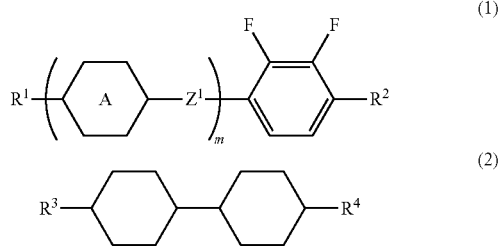

In formulae (1) and (2), $R^1$ is alkenyl having 2 to 12 carbons; $R^2$ is alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; $R^3$ and $R^4$ are independently alkyl having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; ring A is 1,4-cyclohexylene, 1,4-cyclohexenylene, 1,4-phenylene, 1,4-phenylene in which at least one hydrogen is replaced by fluorine or chlorine, or tetrahydropyran-2,5-diyl; at least one ring A is tetrahydropyran-2,5-diyl; $Z^1$ is a single bond, ethylene or carbonyloxy; m is 2 or 3.

The invention further concerns use of the liquid crystal composition in a liquid crystal display device.

The liquid crystal composition of the invention satisfies at least one of characteristics such as a high maximum temperature of nematic phase, a low minimum temperature of nematic phase, a small viscosity, a suitable optical anisotropy, a large negative dielectric anisotropy, a large specific resistance, a high stability to UV light and a high stability to heat, or has a suitable balance regarding at least two of the characteristics. The AM LCD device of the invention including such a composition has characteristics such as a short response time, a large voltage holding ratio, a low threshold voltage, a large contrast ratio and a long service life.

DESCRIPTION OF EMBODIMENTS

Usage of the terms herein is as described below. The terms "liquid crystal composition" and "LCD device" may be occasionally abbreviated as "composition" and "device," respectively. "LCD device" is a generic term for an LCD panel and an LCD module. "liquid crystal compound" is a generic term for a compound having a liquid crystal phase such as a nematic phase or a smectic phase, and a compound having no liquid crystal phase but being mixed with the composition for adjusting characteristics such as the temperature range of the nematic phase, viscosity and dielectric anisotropy. The compound has a six-membered ring such as 1,4-cyclohexylene or 1,4-phenylene, and a rod like molecular structure. A polymerizable compound may be added to form a polymer in the composition.

The liquid crystal composition is prepared by mixing a plurality of liquid crystal compounds. The proportion (content) of s liquid crystal compound is expressed in terms of weight percentage (wt %) based on the weight of the liquid crystal composition. An additive such as an optically active compound, an antioxidant, an UV light absorbent, a dye, a defoaming agent, a polymerizable compound, a polymerization initiator or a polymerization inhibitor is added to the composition if needed. The proportion (content) of an additive is expressed in terms of weight percentage (wt %) based on the weight of the liquid crystal composition as in the case of the proportion of the liquid crystal compound. Parts per million by weight (ppm) may be used in several cases. The proportion of the polymerization initiator and the polymerization inhibitor is exceptionally represented based on the weight of the polymerizable compound.

"Higher limit of the temperature range of the nematic phase" may be occasionally abbreviated as "maximum temperature." "Lower limit of the temperature range of the nematic phase" may be occasionally abbreviated as "minimum temperature." The expression "having a large specific resistance" means that the composition has a large specific resistance at room temperature and also at a temperature close to the maximum temperature of nematic phase in an initial stage, and that the composition has a large specific resistance at room temperature and also at a temperature close to the maximum temperature of nematic phase even after the device has been used for a long period of time. The expression "having a large voltage holding ratio" means that the device has a large voltage holding ratio at room temperature and also at a temperature close to the maximum temperature of nematic phase in an initial stage, and that the device has a large voltage holding ratio at room temperature and also at a temperature close to the maximum temperature of nematic phase even after the device has been used for a long period of time. The expression "increase dielectric anisotropy" means that the value positively increases when the composition has a positive dielectric anisotropy, and means that the value negatively increases when the composition has a negative dielectric anisotropy.

The expression "at least one 'A' may be replaced by 'B'" means that the number of 'A' is arbitrary. When the number of 'A' is one, the position of 'A' is arbitrary. When the number of 'A' is 2 or more, the positions thereof can be selected without restriction. This rule also applies to an expression "at least one 'A' is replaced by 'B'."

In formulae (1) to (5), symbols A, B, C or the like surrounded by a hexagonal shape correspond to ring A, ring B, ring C or the like, respectively. In formula (5), an oblique line crossing a hexagonal shape of ring K means that the bonding position on the ring can be arbitrarily selected for a $P^1$-$Sp^1$ group. The same rule is also applied to a $P^2$-$Sp^2$ group on ring L or the like. A suffix such as h represents the number of groups to be bonded with ring K or the like. When h is 2, two $P^1$-$Sp^1$ groups exist on ring K. Two groups represented by may be identical or different. The same rule is also applied to arbitrary two $P^1$-$Sp^1$ groups when h is larger than 2. The same rule is also applied to any other group. A compound represented by formula (1) may be occasionally abbreviated as compound (1). The abbreviation may be also applied to a compound represented by formula (2) or the like. Compound (1) means one compound or two or more compounds represented by formula (1). The symbol of the terminal group $R^2$ is used for a plurality of compounds in the chemical formulas of the component compounds. In the compounds, two groups represented by arbitrary two $R^2$ may be identical or different. In one case, for example, $R^2$ of compound (1-1) is ethyl and $R^2$ of compound (1-2) is ethyl. In another case, $R^2$ of compound (1-1) is ethyl and $R^2$ of compound (1-2) is propyl. The same rule is also applied to the symbol of any other terminal group or the like. When n is 2 in formula (3), two rings B exist. In the compound, two rings represented by two rings B may be identical or may be different. The same rule is also applied to arbitrary two rings B when n is larger than 2. The same rule is also applied to other symbols such as $Z^1$, ring D and so on.

Then, 2-fluoro-1,4-phenylene means the two divalent groups described below. In the chemical formula, fluorine may be leftward (L) or rightward (R). The same rule is also applied to divalent groups of other asymmetrical rings, such as tetrahydropyran-2,5-diyl.

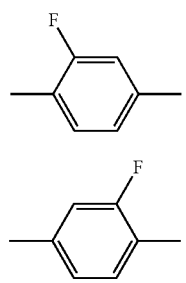

The invention includes the items described below.

Item 1 is a liquid crystal composition that has a negative dielectric anisotropy and contains at least one compound selected from the group consisting of compounds represented by formula (1) as a first component and at least one compound selected from the group consisting of compounds represented by formula (2) as a second component, wherein the proportion of the first component is in the range of 10 wt % to 40 wt % based on the weight of the liquid crystal composition:

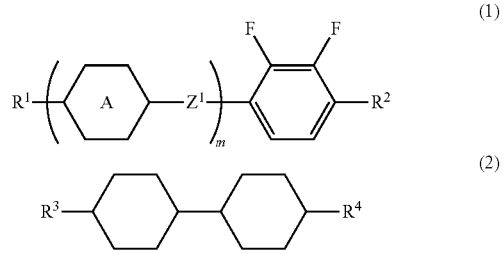

Wherein in formulae (1) and (2), $R^1$ is alkenyl having 2 to 12 carbons; $R^2$ is alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; $R^3$ and $R^4$ are independently alkyl having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; ring A is 1,4-cyclohexylene, 1,4-cyclohexenylene, 1,4-phenylene, 1,4-phenylene in which at least one hydrogen is replaced by fluorine or chlorine, or tetrahydropyran-2,5-diyl, with a proviso that at least one ring A is tetrahydropyran-2,5-diyl; $Z^1$ is a single bond, ethylene or carbonyloxy; and m is 2 or 3.

Item 2 is the liquid crystal composition of item 1 in which the first component contains at least one compound selected from the group consisting of compounds represented by formulae (1-1) to (1-3):

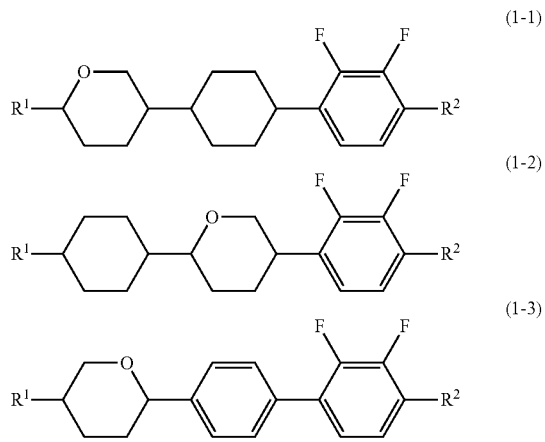

wherein in formulae (1-1) to (1-3), $R^1$ is alkenyl having 2 to 12 carbons; $R^2$ is alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen.

Item 3 is the liquid crystal composition of item 1 or 2 in which the proportion of the second component is in the range of 10 wt % to 70 wt % based on the weight of the liquid crystal composition.

Item 4 is the liquid crystal composition of any one of items 1 to 3 which further contains at least one compound selected from the group consisting of compounds represented by formula (3) as a third component:

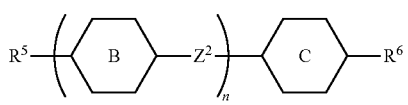
(3)

wherein in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; n is 1, 2 or 3; and when n is 1, ring C is 1,4-phenylene.

Item 5 is the liquid crystal composition of item 4 in which the third component contains at least one compound selected from the group consisting of compounds represented by formulae (3-1) to (3-12):

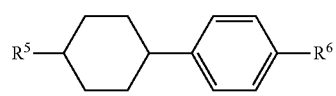
(3-1)

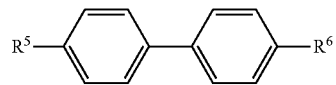
(3-2)

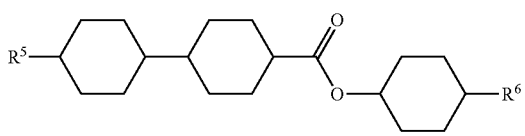
(3-3)

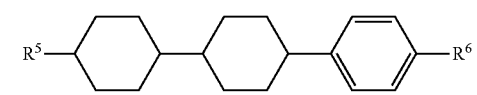
(3-4)

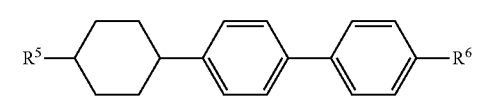
(3-5)

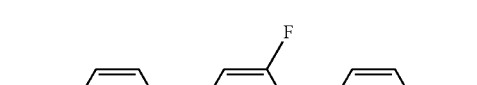
(3-6)

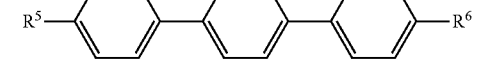
(3-7)

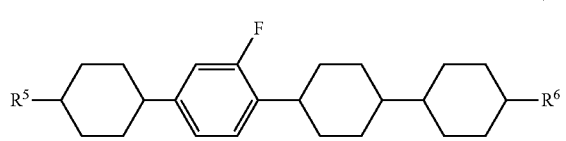
(3-8)

-continued

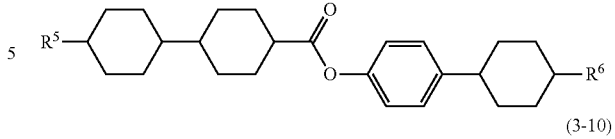
(3-9)

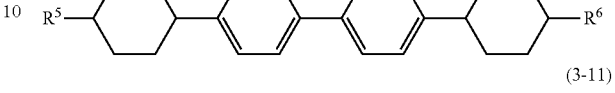
(3-10)

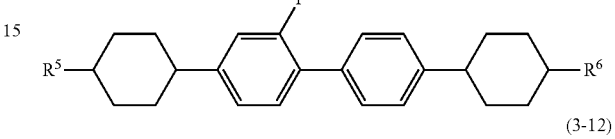
(3-11)

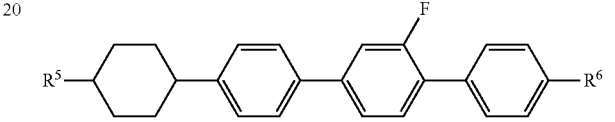
(3-12)

wherein in formulae (3-1) to (3-12), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen.

Item 6 is the liquid crystal composition of item 4 or 5 in which the proportion of the third component is in the range of 5 wt % to 50 wt % based on the weight of the liquid crystal composition.

Item 7 is the liquid crystal composition of any one of items 1 to 6 which further contains at least one compound selected from the group of compounds represented by formula (4) as a fourth component:

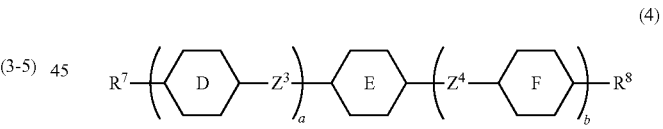
(4)

wherein in formula (4), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; ring D and ring F are independently 1,4-cyclohexylene, 1,4-cyclohexenylene, 1,4-phenylene, or 1,4-phenylene in which at least one hydrogen is replaced by fluorine or chlorine; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; a is 1, 2 or 3; b is 0 or 1; and the sum of a and b is 3 or less.

Item 8 is the liquid crystal composition of item 7 in which the fourth component contains at least one compound selected from the group consisting of compounds represented by formulae (4-1) to (4-15):

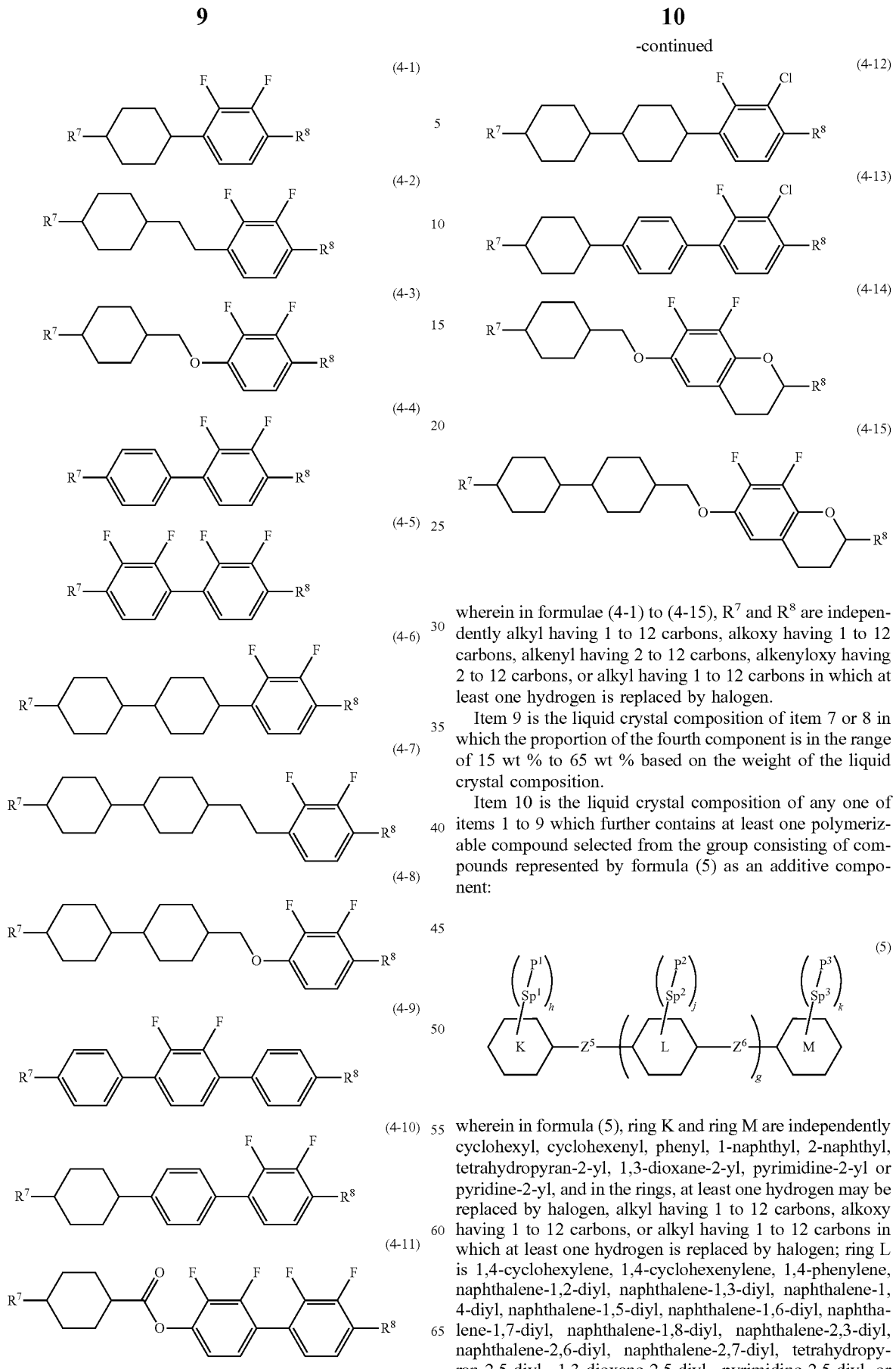

wherein in formulae (4-1) to (4-15), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen.

Item 9 is the liquid crystal composition of item 7 or 8 in which the proportion of the fourth component is in the range of 15 wt % to 65 wt % based on the weight of the liquid crystal composition.

Item 10 is the liquid crystal composition of any one of items 1 to 9 which further contains at least one polymerizable compound selected from the group consisting of compounds represented by formula (5) as an additive component:

wherein in formula (5), ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^5$ and $Z^6$ are independently a single bond or alkylene having 1 to 10 carbons, and in the alkylene, at least one —$CH_2$— may be replaced by —O—, —CO—, —COO— or —OCO—, at least one —$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine; g is 0, 1 or 2; h, j and k are independently 0, 1, 2, 3 or 4; and the sum of h, j and k is 1 or more.

Item 11 is the liquid crystal composition of item 10 in which in formula (5), $P^1$, $P^2$ and $P^3$ are independently a polymerizable group selected from the group consisting of groups represented by formulae (P-1) to (P-6):

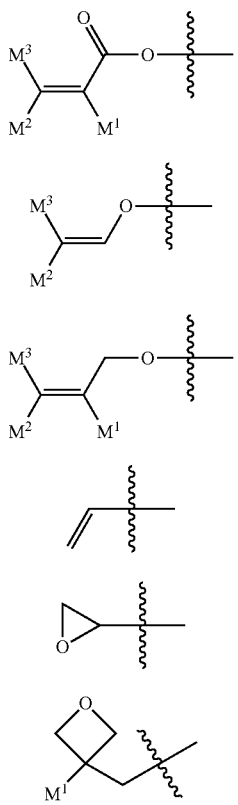

wherein in formulae (P-1) to (P-6), $M^1$, $M^2$ and $M^3$ are independently hydrogen, fluorine, alkyl having 1 to 5 carbons, or alkyl having 1 to 5 carbons in which at least one hydrogen is replaced by halogen; and in formula (5), when all of the h piece(s) of $P^1$ and the k piece(s) of $P^3$ are a group represented by formula (P-4), at least one of the h piece(s) of $Sp^1$ and the k piece(s) of $Sp^3$ is alkylene in which at least one —$CH_2$— is replaced by —O—, —COO—, —OCO— or —OCOO—.

Item 12 is the liquid crystal composition of any one of item 10 or 11 in which the additive component contains at least one polymerizable compound selected from the group consisting of the compounds represented by formulae (5-1) to (5-27):

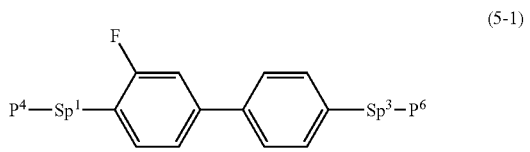

(5-1)

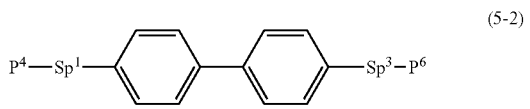

(5-2)

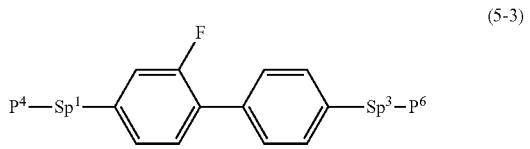

(5-3)

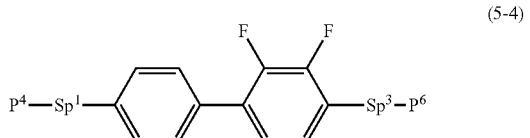

(5-4)

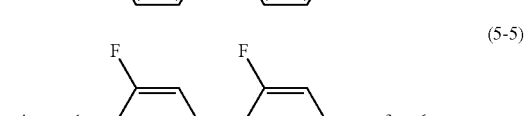

(5-5)

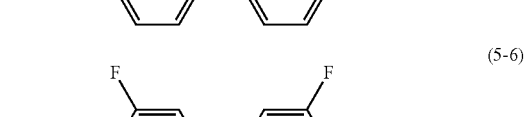

(5-6)

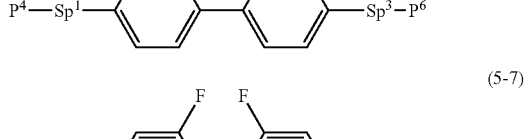

(5-7)

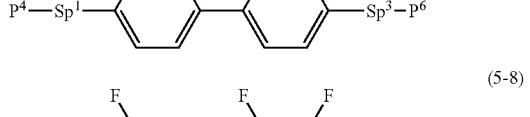

(5-8)

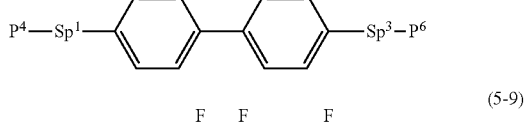

(5-9)

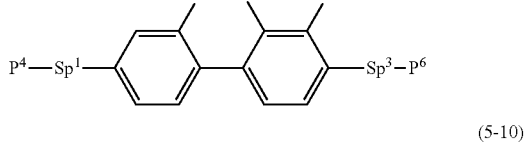

(5-10)

(5-11) 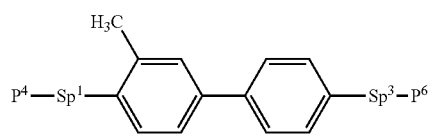
(5-12) 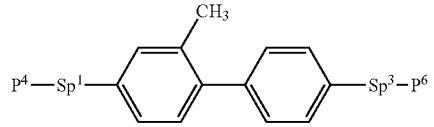
(5-13) 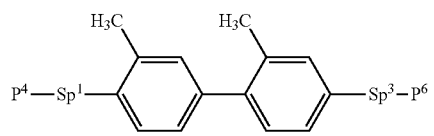
(5-14) 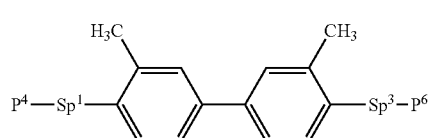
(5-15) 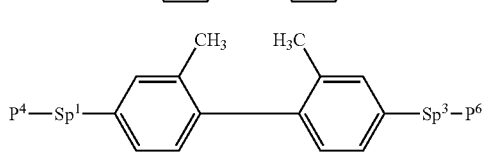
(5-16) 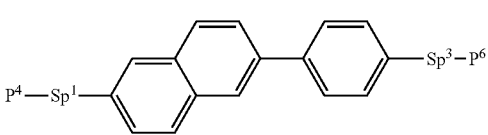
(5-17) 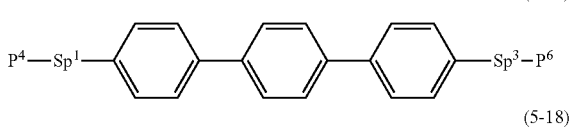
(5-18) 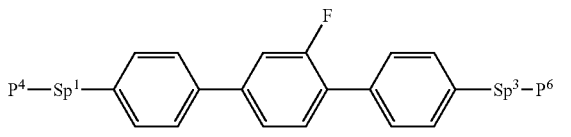
(5-19) 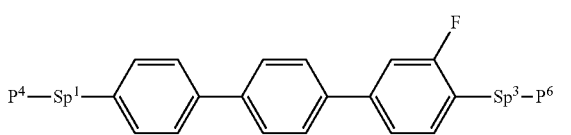
(5-20) 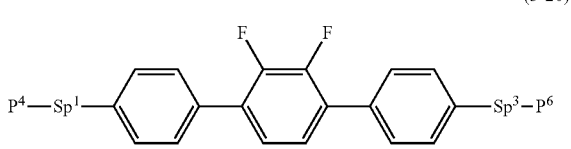
(5-21) 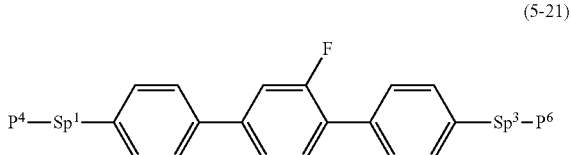
(5-22) 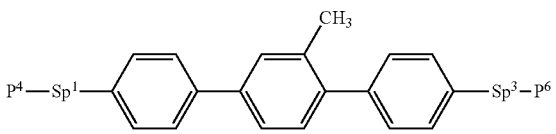
(5-23) 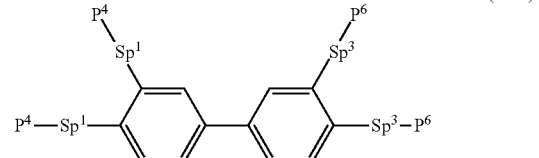
(5-24) 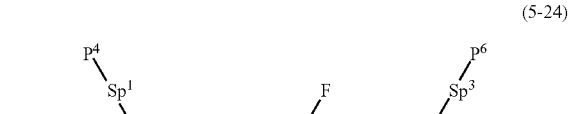
(5-25) 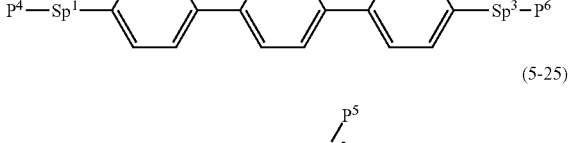
(5-26) 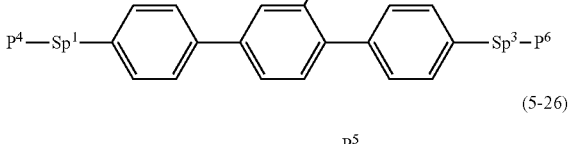
(5-27) 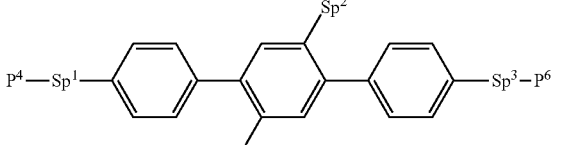
wherein in formulae (5-1) to (5-27), $P^4$, $P^5$ and $P^6$ are independently a polymerizable group selected from the group consisting of groups represented by formulae (P-1) to (P-3);
(P-1) 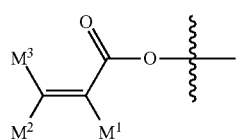

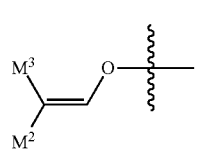

(P-2)

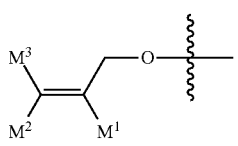

(P-3)

wherein in formulae (P-1) to (P-3), $M^1$, $M^2$ and $M^3$ are independently hydrogen, fluorine, alkyl having 1 to 5 carbons, or alkyl having 1 to 5 carbons in which at least one hydrogen is replaced by halogen; in formulae (5-1) to (5-27), $Sp^1$, $Sp^2$ and $Sp^a$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH═CH— or —C≡C—, and in the groups, at least one hydrogen may be replaced by fluorine or chlorine.

Item 13 is the liquid crystal composition of any one of items 10 to 12 in which the proportion of addition of the additive component is in the range of 0.03 wt % to 10 wt % based on the weight of the liquid crystal composition.

Item 14 is a liquid crystal display device which includes the liquid crystal composition of any one of items 1 to 13.

Item 15 is the liquid crystal display device of item 14 of which the operating mode is an IPS mode, a VA mode, an FFS mode or an FPA mode, and the driving mode is an active matrix mode.

Item 16 is a PSA-mode LCD device which includes the liquid crystal composition of any one of items 10 to 13, or a composition obtained by polymerizing the polymerizable compound in the liquid crystal composition.

Item 17 is use of the liquid crystal composition of any one of items 1 to 13 in a liquid crystal display device.

Item 18 is use of the liquid crystal composition of any one of items 10 to 13 in a PSA-mode LCD device.

The invention further includes the following items: a) the composition which further contains at least one additive such as an optically active compound, an antioxidant, an UV light absorbent, a dye, a defoaming agent, a polymerizable compound, a polymerization initiator and a polymerization inhibitor; b) an AM device including the composition; c) the composition which further contains a polymerizable compound, and a PSA-mode AM device including the composition; d) a PSA-mode AM device including the composition in which a polymerizable compound has been polymerized; e) a device including the composition and having a PC, TN, STN, ECB, OCB, IPS, VA, FFS or FPA mode; f) a transmissive device including the composition; g) use of the composition as a composition having a nematic phase; and h) use of the composition as an optically active composition by adding an optically active compound thereto.

The composition of the invention will be described in the following order. First, the constitution of the component compounds in the composition is described. Second, main characteristics of the component compounds and main effects of the compounds on the composition are described. Third, the combination of components in the composition, preferred proportions of the component compounds and the bases thereof are described. Fourth, preferred embodiments of the component compounds are described. Fifth, preferred component compounds are shown. Sixth, the additives that may be added to the composition are described. Seventh, methods for synthesizing the component compounds are described. Last, the application of the composition is described.

First, the constitution of the component compounds in the composition is described. The composition of the invention is classified into composition A and composition B. Composition A may further contain other liquid crystal compound or the additive in addition to the compound selected from compounds (1), (2), (3), (4) and (5). "Other liquid crystal compound" means a liquid crystal compound different from compounds (1), (2), (3), (4) and (5). Such a compound is mixed with the composition for further adjusting the characteristics. The additives include an optically active compound, an antioxidant, a UV light absorbent, a dye, an antifoaming agent, a polymerizable compound, a polymerization initiator and a polymerization inhibitor.

Composition B consists essentially of compounds selected from the group consisting of compounds (1), (2), (3), (4) and (5). The term "essentially" means that the composition may contain an additive, but does not contain any other liquid crystal compound. Composition B has a smaller number of components than composition A. Composition B is preferred to composition A in view of cost reduction. Composition A is preferred to Composition B, for the characteristics can be further adjusted by mixing other liquid crystal compounds.

Second, the main characteristics of the component compounds and the main effects of the compounds on the characteristics of the composition are described. The main characteristics of the component compounds are summarized in Table 2 on the basis of advantageous effects of the invention. In Table 2, the symbol L stands for "large" or "high," the symbol M stands for "medium," and the symbol S stands for "small" or "low." The symbols L, M and S represent classification based on a qualitative comparison among the component compounds, and 0 (zero) means "a value being nearly zero."

TABLE 2

| Characteristics of Compounds | | | | |
|---|---|---|---|---|
| Compounds | (1) | (2) | (3) | (4) |
| Maximum Temperature | M to L | S to M | S to L | S to L |
| Viscosity | M to L | S | S to M | M to L |
| Optical Anisotropy | M to L | S | S to L | M to L |
| Dielectric Anisotropy | L[1] | 0 | 0 | M to L[1] |
| Specific Resistance | L | L | L | L |

[1]the Δε value is negative, and the symbol shows magnitude of t absolute value.

Upon mixing the component compounds with the composition, the main effects of the component compounds on the characteristics of the composition are as described below. Compound (1) increases the Δε. Compound (2) decreases viscosity. Compound (3) decreases the viscosity or increases the maximum temperature. Compound (4) increases the Δε and decreases the minimum temperature. Compound (5) gives a polymer by polymerization, and the polymer shortens the response time of the device and reduces the image burn-in.

Third, the combination of components in the composition, the preferred proportions of the component compounds and the bases thereof are described. A preferred combination of components in the composition includes a combination of the 1$^{st}$ component and the 2$^{nd}$ component, a combination of the 1$^{st}$ component and the 3$^{rd}$ component, a combination of the 1st component and the 4$^{th}$ component, a combination of the 1$^{st}$ component and the additive component, a combination of the 1$^{st}$ component, the 2$^{nd}$ component and the 3$^{rd}$ component, a combination of the 1$^{st}$ component, the 2$^{nd}$ component and the 4$^{th}$ component, a combination of the 1$^{st}$ component, the 2$^{nd}$ component and the additive component, a combination of the 1$^{st}$ component, the 3$^{rd}$ component and the 4$^{th}$ component, a combination of the 1$^{st}$ component, the 3$^{rd}$ component and the additive component, a combination of the 1$^{st}$ component, the 4$^{th}$ component and the additive component, a combination of the 1$^{st}$ component, the 2$^{nd}$ component, the 3$^{rd}$ component and the 4$^{th}$ component, a combination of the 1$^{st}$ component, the 2$^{nd}$ component, the 3$^{rd}$ component and the additive component, a combination of the 1$^{st}$ component, the 2nd component, the 4$^{th}$ component and the additive component, a combination of the 1$^{st}$ component, the 3$^{rd}$ component, the 4$^{th}$ component and the additive component or a combination of the 1$^{st}$ component, the 2$^{nd}$ component, the 3$^{rd}$ component, the 4$^{th}$ component and the additive component. A further preferred combination includes a combination of the 1$^{st}$ component, the 2$^{nd}$ component and the 3$^{rd}$ component, a combination of the 1$^{st}$ component, the 2$^{nd}$ component, the 3$^{rd}$ component and the 4$^{th}$ component, a combination of the 1$^{st}$ component, the 2$^{nd}$ component, the 3$^{rd}$ component and the additive component or a combination of the 1$^{st}$ component, the 2$^{nd}$ component, the 3$^{rd}$ component, the 4$^{th}$ component and the additive component.

A preferred proportion of the first component is about 10 wt % or more for increasing the dielectric anisotropy, and about 40 wt % or less for decreasing the viscosity, based on the weight of the liquid crystal composition. A further preferred proportion is in the range of about 10 wt % to about 35 wt %. A particularly preferred proportion is in the range of about 10 wt % to about 30 wt %.

A preferred proportion of the second component is about 10 wt % or more for decreasing the viscosity, and about 70 wt % or less for increasing the dielectric anisotropy, based on the weight of the liquid crystal composition. A further preferred proportion is in the range of about 15 wt % to about 65 wt %. A particularly preferred proportion is in the range of about 20 wt % to about 60 wt %.

A preferred proportion of the third component is about 5 wt % or more for increasing the maximum temperature or decreasing the viscosity, and about 50 wt % or less for increasing the dielectric anisotropy, based on the weight of the liquid crystal composition. A further preferred proportion is in the range of about 5 wt % to about 40 wt %. A particularly preferred proportion is in the range of about 5 wt % to about 35 wt %.

A preferred proportion of the fourth component is about 15 wt % or more for increasing the dielectric anisotropy, and about 65 wt % or less for decreasing the minimum temperature, based on the weight of the liquid crystal composition. A further preferred proportion is in the range of about 20 wt % to about 60 wt %. A particularly preferred proportion is in the range of about 25 wt % to about 55 wt %.

Compound (5) is added to the composition to adapt the composition to a PSA-mode device. A preferred addition proportion of the additive is about 0.03 wt % or more for aligning the liquid crystal molecules, and about 10 wt % or less for preventing a poor display in the device, based on the weight of the liquid crystal composition. A further preferred proportion of addition is in the range of about 0.1 wt % to about 2 wt %. A particularly preferred proportion is in the range of about 0.2 wt % to about 1.0 wt %.

Fourth, preferred embodiments of the component compounds are described. In formulae (1), (2), (3), (4) and (5), R$^1$ is alkenyl having 2 to 12 carbons. R$^2$, R$^7$ and R$^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen. Preferred R$^2$, R$^7$ or R$^8$ is alkyl having 1 to 12 carbons for increasing the stability, or alkoxy having 1 to 12 carbons for increasing the dielectric anisotropy. R$^3$ and R$^4$ are independently alkyl having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen. Preferred R$^3$ or R$^4$ is alkenyl having 2 to 12 carbons for decreasing the viscosity, or alkyl having 1 to 12 carbons for increasing the stability. R$^5$ and R$^6$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen. Preferred R$^5$ or R$^6$ is alkenyl having 2 to 12 carbons for decreasing the viscosity, or alkyl having 1 to 12 carbons for increasing the stability.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred examples of alkyl in which at least one hydrogen is replaced by halogen include fluoromethyl, 2-fluoroethyl, 3-fluoropropyl, 4-fluorobutyl, 5-fluoropentyl, 6-fluorohexyl, 7-fluoroheptyl and 8-fluorooctyl. Further preferred examples include 2-fluoroethyl, 3-fluoropropyl, 4-fluorobutyl or 5-fluoropentyl for increasing the dielectric anisotropy.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing viscosity. The preferred configuration of —CH=CH— in the alkenyl depends on the position of the double bond. Trans is preferred in alkenyl groups such as 1-propenyl, 1-butenyl, 1-pentenyl, 1-hexenyl, 3-pentenyl and 3-hexenyl for decreasing the viscosity. Cis is preferred in alkenyl groups such as 2-butenyl, 2-pentenyl and 2-hexenyl. For the alkenyl, straight alkenyl is preferred to branched alkenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Preferred examples of alkenyl in which at least one hydrogen is replaced by halogen include 2,2-difluorovinyl, 3,3-difluoro-2-propenyl, 4,4-difluoro-3-butenyl, 5,5-difluoro-4-pentenyl and 6,6-difluoro-5-hexenyl. More preferred examples include 2,2-difluorovinyl and 4,4-difluoro-3-butenyl for decreasing the viscosity.

Ring A is 1,4-cyclohexylene, 1,4-cyclohexenylene, 1,4-phenylene, 1,4-phenylene in which at least one hydrogen is replaced by fluorine or chlorine, or tetrahydropyran-2,5-diyl, wherein at least one ring A is tetrahydropyran-2,5-diyl. Preferred examples of "1,4-phenylene in which at least one hydrogen is replaced by fluorine or chlorine" include 2-fluoro-1,4-phenylene, 2,3-difluoro-1,4-phenylene and 2-chloro-3-fluoro-1,4-phenylene. Preferred ring A is 1,4- cyclohexylene for decreasing the viscosity, is tetrahydropyran-2,5-diyl for increasing the dielectric anisotropy, or is 1,4-phenylene for increasing optical anisotropy. With regard to the configuration of 1,4-cyclohexylene, trans is preferred to cis for increasing the maximum temperature. Tetrahydropyran-2,5-diyl includes:

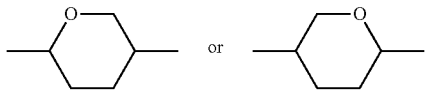

and preferably

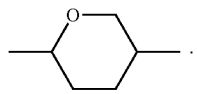

Ring B and ring C are independently 1,4-cyclohexylene, 1,4-phenylene, 2-fluoro-1,4-phenylene or 2,5-difluoro-1,4-phenylene. Preferred ring B or ring C is 1,4-cyclohexylene for decreasing the viscosity or increasing the maximum temperature, or is 1,4-phenylene for decreasing the minimum temperature.

Ring D and ring F are independently 1,4-cyclohexylene, 1,4-cyclohexenylene, 1,4-phenylene, or 1,4-phenylene in which at least one hydrogen is replaced by fluorine or chlorine. Preferred ring D or ring F is 1,4-cyclohexylene for decreasing the viscosity, or is 1,4-phenylene for increasing the optical anisotropy.

Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring E is 2,3-difluoro-1,4-phenylene for decreasing the viscosity, or 2-chloro-3-fluoro-1,4-phenylene for decreasing optical anisotropy, or 7,8-difluorochroman-2,6-diyl for increasing dielectric anisotropy.

$Z^1$ and $Z^2$ are independently a single bond, ethylene or carbonyloxy. Preferred $Z^1$ or $Z^2$ is a single bond for decreasing the viscosity, or is ethylene for decreasing the minimum temperature. $Z^3$ and $Z^4$ are independently a single bond, ethylene, carbonyloxy or methyleneoxy. Preferred $Z^3$ or $Z^4$ is a single bond for decreasing the viscosity, or is ethylene for decreasing the minimum temperature, or is methyleneoxy for increasing the dielectric anisotropy.

Then, m is 2 or 3. Preferred m is 1 for decreasing the minimum temperature. Then, n is 1, 2 or 3. Preferred n is 1 for decreasing the viscosity, or is 2 or 3 for increasing the maximum temperature. Then, a is 1, 2 or 3, b is 0 or 1, and the sum of a and b is 3 or less. Preferred a is 1 for decreasing the viscosity, or is 2 or 3 for increasing the maximum temperature. Preferred b is 0 for decreasing viscosity, or is 1 for decreasing the minimum temperature.

In formula (5), $P^1$, $P^2$ and $P^3$ are independently a polymerizable group. Preferred $P^1$, $P^2$ or $P^3$ is a polymerizable group selected from the group consisting of groups represented by formulae (P-1) to (P-6). Further preferred $P^1$, $P^2$ or $P^3$ is group (P-1) or (P-2). Particularly preferred group (P-1) is —OCO—CH=CH$_2$ or —OCO—C(CH$_3$)=CH$_2$. The wavy line in groups (P-1) to (P-6) indicates the bonding site.

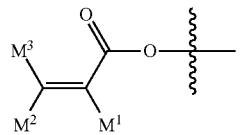

(P-1)

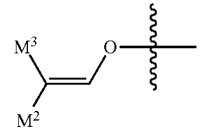

(P-2)

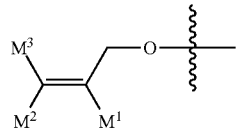

(P-3)

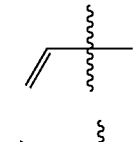

(P-4)

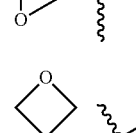

(P-5)

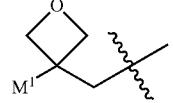

(P-6)

In groups (P-1) to (P-6), $M^1$, $M^2$ and $M^3$ are independently hydrogen, fluorine, alkyl having 1 to 5 carbons, or alkyl having 1 to 5 carbons in which at least one hydrogen is replaced by halogen. Preferred $M^1$, $M^2$ or $M^3$ is hydrogen or methyl for increasing reactivity. Further preferred $M^1$ is methyl, and further preferred $M^2$ or $M^3$ is hydrogen. When at least two of the h piece (s) of $P^1$, the g set (s) of j piece (s) of $P^2$ and the k piece (s) of $P^3$ are group (P-1), of arbitrary two $M^1$, $M^2$ or $M^3$ in $P^1$, $P^2$ and $P^3$ may be identical or different. When the at least two are group (P-2) or (P-3), a similar rule is also applied.

When all of the h pieces of $P^1$ and the k pieces of $P^3$ are group (P-4), at least one of the h pieces of $Sp^1$ and the k pieces of $Sp^3$ is alkylene in which at least one —CH$_2$— is replaced by —O—, —OCO—, —OCO— or —OCOO—. More specifically, a case where all of the h pieces of $P^1$ and the k pieces of $P^3$ are alkenyl such as 1-propenyl is excluded.

In formulae (5-1) to (5-27), $P^4$, $P^5$ and $P^6$ are independently a group represented by formula (P-1), (P-2) or (P-3). Preferred $P^4$, $P^5$ or $P^6$ is group (P-1) or (P-2). More preferred group (P-1) is —OCO—CH=CH$_2$ or —OCO—C(CH$_3$)=CH$_2$. The wavy line in group (P-1), (P-2) or (P-3) indicates the bonding site.

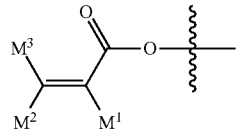

(P-1)

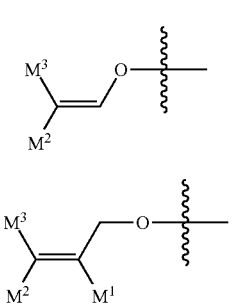

(P-2)

(P-3)

When at least two of one or two $P^4$, one or two $P^5$ and one or two $P^6$ are group (P-1), arbitrary two $M^1$, $M^2$ or $M^3$ of $P^4$, $P^5$ and $P^6$ may be identical or different. When the at least two are group (P-2) or (P-3), the same rule is also applied.

In formula (5), $Sp^1$, $Sp^2$ and $Sp^3$ are independently a single bond or alkylene having 1 to 10 carbons, and in the alkylene, at least one —CH$_2$— may be replaced by —O—, —COO—, —OCO— or —OCOO—, at least one —CH$_2$—CH$_2$— may be replaced by —CH=CH— or —C≡C—, and in the groups, at least one hydrogen may be replaced by fluorine or chlorine. Preferred $Sp^1$, $Sp^2$ or $Sp^3$ is a single bond.

Ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl or pyridin-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen. Preferred ring K or ring M is phenyl. Ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen. Preferred ring L is 1,4-phenylene or 2-fluoro-1,4-phenylene.

$Z^5$ and $Z^6$ are independently a single bond or alkylene having 1 to 10 carbons, and in the alkylene, at least one —CH$_2$— may be replaced by —O—, —CO—, —COO— or —OCO—, at least one —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one hydrogen may be replaced by fluorine or chlorine. Preferred $Z^5$ or $Z^6$ is a single bond, —CH$_2$CH$_2$—, —CH$_2$O—, —OCH$_2$—, —COO— or —OCO—. Further preferred $Z^5$ or $Z^6$ is a single bond.

Then, g is 0, 1 or 2. Preferred g is 0 or 1. Then, h, j and k are independently 0, 1, 2, 3 or 4, and the sum of h, j and k is 1 or more. Preferred h, j or k is 1 or 2.

Fifth, the preferred component compounds are shown. Preferred compounds (1) include compounds (1-1) to (1-3) as described in item 2. It is preferred that at least one compound in the first component is compound (1-2) among the compounds.

Preferred compounds (3) include compounds (3-1) to (3-12) as described in item 5. It is preferred that at least one compound in the third component is compound (3-2), (3-4), (3-5) or (3-6) among the compounds. It is also preferred that at least two compounds in the third component are a combination of compounds (3-2) and (3-4) or a combination of compounds (3-2) and (3-6).

Preferred compounds (4) include compounds (4-1) to (4-15) as described in item 8. It is preferred that at least one compound in the fourth component is compound (4-1), (4-2), (4-3), (4-4), (4-6), (4-7), (4-8), (4-9) or (4-10) among the compounds. It is preferred that at least two compounds in the fourth component are a combination of compounds (4-1) and (4-6), a combination of compounds (4-1) and (4-10), a combination of compounds (4-2) and (4-7), a combination of compounds (4-3) and (4-6), a combination of compounds (4-3) and (4-8), a combination of compounds (4-4) and (4-6), or a combination of compounds (4-4) and (4-8).

Preferred compounds (5) include compounds (5-1) to (5-27) as described in item 12. It is preferred that at least one compound in the additive component is compound (5-1), (5-2), (5-24), (5-25), (5-26) or (5-27) among the compounds. It is also preferred that at least two compounds in the additive component are a combination of compounds (5-1) and (5-2), a combination of compounds (5-1) and (5-18), a combination of compounds (5-2) and (5-24), a combination of compounds (5-2) and (5-25), a combination of compounds (5-2) and (5-26), a combination of compounds (5-25) and (5-26), or a combination of compounds (5-18) and (5-24). In groups (P-1) to (P-3), preferred $M^1$, $M^2$ or $M^3$ is hydrogen or methyl. Preferred $Sp^1$, $Sp^2$ or $Sp^a$ is a single bond, —CH$_2$CH$_2$—, —CH$_2$O—, —OCH$_2$—, —COO—, —OCO—, —CO—CH=CH— or —CH=CH—CO—.

Sixth, the additives that may be added to the composition are described. Such additives include an optically active compound, an antioxidant, a UV light absorbent, a dye, an antifoaming agent, a polymerizable compound, a polymerization initiator and a polymerization inhibitor. The optically active compound is added to the composition for inducing a helical structure in liquid crystals to give a twist angle. Examples of such a compound include compounds (6-1) to (6-5). A preferred proportion of the optically active compound is about 5 wt % or less based on the weight of the liquid crystal composition. A further preferred proportion is in the range of about 0.01 wt % to about 2 wt % based thereon.

(6-1)

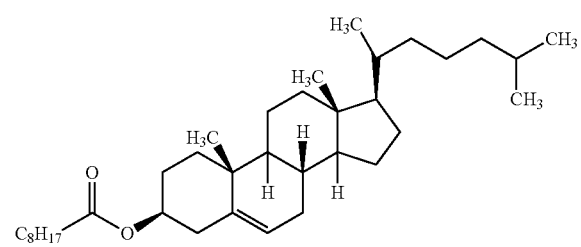

(6-2)

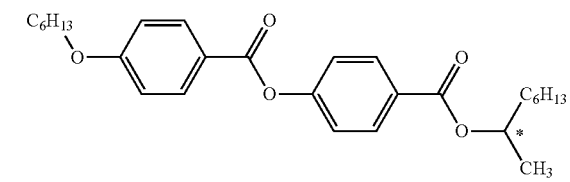

-continued

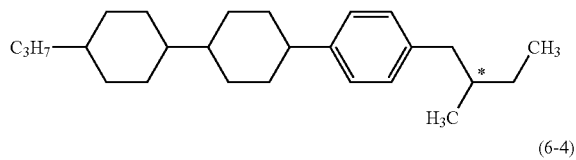

(6-3)

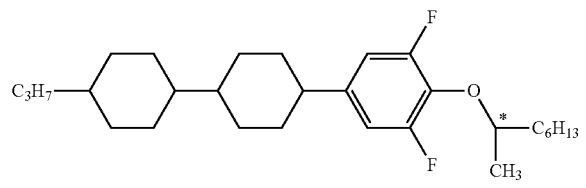

(6-4)

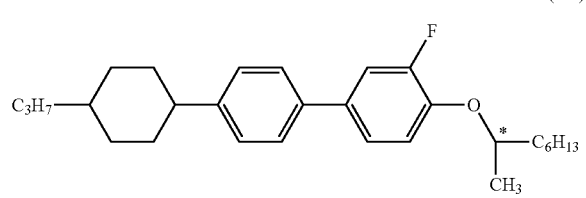

(6-5)

The antioxidant is added to the composition for preventing a decrease in specific resistance caused by heating in air, or for maintaining a large voltage holding ratio at room temperature and also at a temperature close to the maximum temperature after the device has been used for a long period of time. Preferred examples of the antioxidant include compound (7) where n is an integer from 1 to 9.

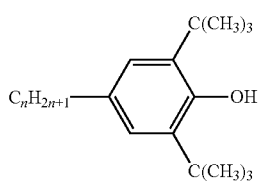

(7)

For compound (7), preferred n is 1, 3, 5, 7 or 9. Further preferred n is 7. Compound (7) of n=7 is effective in maintaining a large voltage holding ratio at room temperature and also at a temperature close to the maximum temperature after the device has been used for a long period of time, because such compound (7) has a small volatility. A preferred proportion of the antioxidant is about 50 ppm or more for achieving the effect thereof, and about 600 ppm or less for avoiding a decrease in the maximum temperature or avoiding an increase in the minimum temperature. A further preferred proportion is in the range of about 100 ppm to about 300 ppm.

Preferred examples of the UV light absorbent include a benzophenone derivative, a benzoate derivative and a triazole derivative. A light stabilizer such as an amine having steric hindrance is also preferred. A preferred proportion of the UV light absorbent or the stabilizer is about 50 ppm or more for achieving the effect thereof, and about 10,000 ppm or less for avoiding a decrease in the maximum temperature or avoiding an increase in the minimum temperature. A further preferred proportion is in the range of about 100 ppm to about 10,000 ppm.

A dichroic dye such as an azo dye or an anthraquinone dye is added to the composition to adapt the composition to a device having a guest host (GH) mode. A preferred proportion of the dye is in the range of about 0.01 wt % to about 10 wt % based on the weight of the liquid crystal composition. The antifoaming agent such as dimethyl silicone oil or methyl phenyl silicone oil is added to the composition for preventing foam formation. A preferred proportion of the antifoaming agent is about 1 ppm or more for achieving its effect, and about 1,000 ppm or less for avoiding a poor display. A further preferred proportion is in the range of about 1 ppm to about 500 ppm.

The polymerizable compound is used to adapt the composition to a PSA-mode device. Compound (5) fits for the purpose. A polymerizable compound different from compound (5) may be added to the composition together with compound (5). Preferred examples of such a polymerizable compound include compounds such as an acrylate, a methacrylate, a vinyl compound, a vinyloxy compound, a propenyl ether, an epoxy compound (oxirane, oxetane) and a vinyl ketone. Further preferred examples include an acrylate derivative and a methacrylate derivative. A preferred proportion of compound (5) is about 10 wt % or more based on the total weight of the polymerizable compound. A further preferred proportion is about 50 wt % or more. A particularly preferred proportion is about 80 wt % or more. A most preferred proportion is about 100 wt %.

The polymerizable compound such as compound (5) is polymerized by UV irradiation. The compound may be polymerized in the presence of a suitable initiator such as a photo-polymerization initiator. Suitable conditions for polymerization, suitable types of the initiator and suitable amounts thereof are known to those of ordinary skill in the art and are described in literature. For example, Irgacure 651™ (BASF), Irgacure 184™ (BASF) or Darocur 1173™ (BASF), each being a photo-polymerization initiator, is suitable for radical polymerization. A preferred proportion of the photo-polymerization initiator is in the range of about 0.1 wt % to about 5 wt % based on the total weight of the polymerizable compound. A more preferred proportion ranges from about 1 wt % to about 3 wt %.

When the polymerizable compound such as compound (5) is stored, a polymerization inhibitor may be added for preventing polymerization. The polymerizable compound is added to the composition ordinarily without removing the polymerization inhibitor. Examples of the polymerization inhibitor include hydroquinone, a hydroquinone derivative such as methylhydroquinone, 4-t-butylcatechol, 4-methoxyphenol and phenothiazine.

Seventh, methods for synthesizing the component compounds are described. The compounds can be prepared by known synthetic methods as exemplified below. Compound (1) may be prepared by the method described in JP 2000-53602 A. Compound (2) may be prepared by the method described in JP S59-176221 A. Compound (3-1) may be prepared by the method described in JP S56-68636 A. Compound (4-1) may be prepared by the method described in JP H2-503441 A. A compound represented by formula (7) of n=1 is available from Sigma-Aldrich Corporation. Compound (7) of n=7 and so forth may be prepared by the method described in U.S. Pat. No. 3,660,505 B.

Any compounds whose synthetic methods are not described above can be prepared by methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Maruzen Co., Ltd.). The composition is prepared by well-known methods using thus obtained compounds. For example, the component compounds are mixed and dissolved in each other by heating.

Last, the application of the composition are described. The composition mainly has a minimum temperature of about −10° C. or lower, a maximum temperature of about 70° C. or higher, and a Δn value in the range of about 0.07 to about 0.20. A device including the composition has a large voltage holding ratio. The composition is suitable for use in the AM device. The composition is particularly suitable for use in a transmissive AM device. The composition having a Δn value in the range of about 0.08 to about 0.25, and also the composition having a Δn value in the range of about 0.10 to about 0.30 may be prepared by controlling the ratio of the component compounds or by mixing any other liquid crystal compound. The composition can be used as the composition having a nematic phase or as an optically active composition by adding an optically active compound.

The composition can be used for an AM device, and can also be used for a PM device. The composition can be used for an AM device and a PM device having a mode such as PC, TN, STN, ECB, OCB, IPS, FFS, VA or FPA. Use for the AM device having the TN, OCB, IPS or FFS mode is particularly preferred. In the AM device having the IPS or FFS mode, alignment of liquid crystal molecules when no voltage is applied may be parallel or perpendicular to a glass substrate. The devices may be of a reflective type, a transmissive type or a transflective type. Use for the transmissive device is preferred. The composition can also be used for an amorphous silicon-TFT device or a polysilicon-TFT device. The composition can also be used for a nematic curvilinear aligned phase (NCAP) mode device prepared by microencapsulating the composition, and for a polymer dispersed (PD) mode device in which a 3D network-polymer is formed in the composition.

EXAMPLES

The invention will be described in more detail by way of Examples, but is not restricted thereto. For example, the invention includes a mixture of the composition in Example 1 and the composition in Example 2, and also includes a mixture prepared by mixing at least two of the compositions in all Examples. A prepared compound was identified by a method such as NMR analysis. Characteristics of the compound and the composition were measured by methods as described below.

NMR analysis: For measurement, DRX-500 made by Bruker BioSpin Corporation was used. In $^1$H-NMR measurement, a sample was dissolved in a deuterated solvent such as CDCl$_3$, and the measurement was carried out under conditions of room temperature, 500 MHz and 16 times of accumulation. Tetramethylsilane was used as an internal standard. In $^{19}$F-NMR measurement, measurement was carried out under conditions of 24 times of accumulation using CFCl$_3$ as an internal standard. In the explanation of NMR spectra, s, d, t, q, quin, sex and m stand for a singlet, a doublet, a triplet, a quartet, a quintet, a sextet and a multiplet, respectively, and br means being broad.

Gas Chromatographic Analysis: GC-14B Gas Chromatograph made by Shimadzu Corporation was used for the measurement. A carrier gas was helium (2 mL/min). The sample injector and the detector (FID) were set to 280° C. and 300° C., respectively. A capillary column DB-1 (length: 30 m, bore: 0.32 mm, film thickness: 0.25 μm; dimethylpolysiloxane as a stationary phase, non-polar) made by Agilent Technologies, Inc. was used to separate the component compounds. After the column was kept at 200° C. for 2 min, it was heated to 280° C. at a rate of 5° C./min. A sample was prepared in an acetone solution (0.1 wt %), and then 1 μL of the solution was injected into the sample injector. The recorder was C-R5A Chromatopac made by Shimadzu Corporation or the equivalent thereof. The resulting chromatogram showed a peak retention time and a peak area corresponding to each of the component compounds.

As a solvent for diluting the sample, chloroform, hexane and so forth may also be used. The following capillary columns may also be used to separate the component compounds: HP-1 (length: 30 m, bore: 0.32 mm, film thickness: 0.25 μm) made by Agilent Technologies, Inc., Rtx-1 (length: 30 m, bore: 0.32 mm, film thickness: 0.25 μm) made by Restek Corporation and BP-1 (length: 30 m, bore: 0.32 mm, film thickness: 0.25 μm) made by SGE International Pty. Ltd. A capillary column CBP1-M50-025 (length: 50 m, bore: 0.25 mm, film thickness: 0.25 μm) made by Shimadzu Corporation may also be used for the purpose of avoiding an overlap of peaks of the compounds.

The proportions of the liquid crystal compounds contained in the composition may be calculated by the method as described below. A mixture of liquid crystal compounds is detected by a gas chromatograph (FID). The ratio of the peak areas in the gas chromatogram corresponds to the ratio (weight ratio) of the liquid crystal compounds. When the capillary columns described above were used, the correction coefficient of each of the liquid crystal compounds may be regarded as 1 (one). Accordingly, the proportions (wt %) of the liquid crystal compounds can be calculated from the ratio of the peak areas.

Measurement sample: When characteristics of a composition or a device were to be measured, the composition was used as a sample as was. When the characteristics of a compound were to be measured, a measurement sample was prepared by mixing the compound (15 wt %) with a base liquid crystal (85 wt %). Values of characteristics of the compound were calculated using values obtained by the measurement, with an extrapolation method: (extrapolated value)={(measured value of a sample)−0.85×(measured value of base liquid crystal)}/0.15. When a smectic phase (or crystals) precipitated at the above ratio at 25° C., the ratio of the compound to the base liquid crystal was changed step by step in the order of (10 wt %:90 wt %), (5 wt %:95 wt %) and (1 wt %:99 wt %). Values of maximum temperature, optical anisotropy, viscosity and dielectric anisotropy with regard to the compound were determined with the extrapolation method.

The base liquid crystal shown below was used. The proportions of component compounds were expressed in terms of weight percent (wt %).

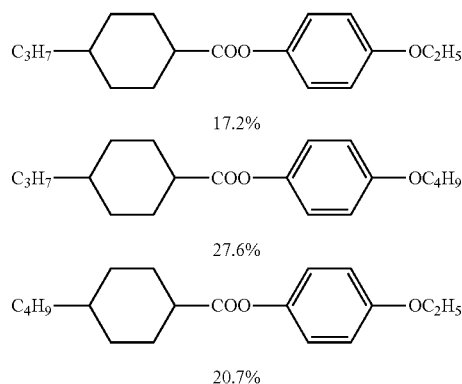

-continued

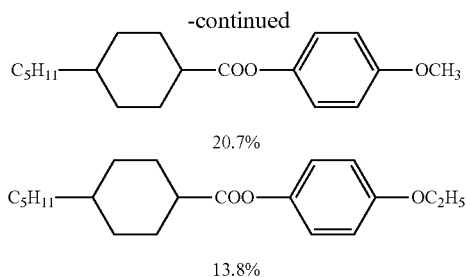

20.7%

13.8%

Measurement method: Characteristics were measured with the methods described below. Most of the measurement methods are applied as described in the standard "JEITA·ED-2521B" discussed and established by the Japan Electronics and Information Technology Industries Association (JEITA), or as modified thereon. No thin film transistor (TFT) was attached to the TN device used for measurement.

1) Maximum temperature of a nematic phase (NI; ° C.): A sample was placed on a hot plate in a melting point apparatus equipped with a polarizing microscope and was heated at a rate of 1° C./min. The temperature at which a part of the sample began to change from a nematic phase to an isotropic liquid was measured. The higher limit of the temperature range of the nematic phase may be occasionally abbreviated as "maximum temperature."

2) Minimum temperature of a nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained a nematic phase at −20° C. and changed to crystals or a smectic phase at −30° C., $T_c$ was expressed as $T_c$<−20° C. The lower limit of the temperature range of the nematic phase may be occasionally abbreviated as "minimum temperature."

3) Viscosity (bulk viscosity; η; measured at 20° C.; mPa·s): A cone-plate (E-type) rotational viscometer made by Tokyo Keiki Inc. was used for the measurement.

4) Viscosity (rotational viscosity; γ1; measured at 25° C.; mPa·s): The measurement was carried out by the method described in M. Imai et al., *Molecular Crystals and Liquid Crystals*, Vol. 259, p. 37 (1995). A sample was put in a VA device in which the distance (cell gap) between two glass substrates was 20 μm. Voltage was applied stepwise to the device in the range of 39 V to 50 V at an increment of 1 V. After a period of 0.2 sec with no voltage, voltage was applied repeatedly under the conditions of only one rectangular wave (rectangular pulse; 0.2 sec) and no voltage (2 sec). The peak current and the peak time of a transient current generated by the applied voltage were measured. The value of rotational viscosity was obtained from the measured values and Equation (8) on page 40 of the paper of M. Imai et al. The dielectric anisotropy necessary for the calculation was measured as described in section 6).

5) Optical anisotropy (refractive index anisotropy; Δn; measured at 25° C.): The measurement was carried out by an Abbe refractometer with a polarizing plate mounted on an ocular, using light at a wavelength of 589 nm. A surface of a main prism was rubbed in one direction, and then a sample was added dropwise onto the main prism. The refractive index $n_∥$ was measured when the direction of polarized light was parallel to the direction of rubbing. The refractive index $n_⊥$ was measured when the direction of polarized light was perpendicular to the direction of rubbing. The value of optical anisotropy was calculated from the equation "Δn=$n_∥$−$n_⊥$."

6) Dielectric anisotropy (Δ∈; measured at 25° C.): The value of dielectric anisotropy was calculated from the equation "Δ∈=∈$_∥$−∈$_⊥$." The dielectric constants ∈$_∥$ and ∈$_⊥$ was measured as described below.

a) Measurement of dielectric constant $∆_∥$: ethanol (20 mL) solution of octadecyl triethoxysilane (0.16 mL) was applied to a well-cleaned glass substrate. After rotating the glass substrate with a spinner, the glass substrate was heated at 150° C. for 1 hour. A sample was put in a VA device in which the distance (cell gap) between two glass substrates was 4 μm, and the device was sealed with an UV-curable adhesive. Sine waves (0.5 V, 1 kHz) were applied to the device, and after 2 sec, the dielectric constant ∈$_∥$ in the major axis direction of liquid crystal molecules was measured.

b) Measurement of dielectric constant ∈$_⊥$: A polyimide solution was applied to a well-cleaned glass substrate. After the glass substrate was calcined, rubbing treatment was applied to the alignment film obtained. A sample was put in a TN device in which the distance (cell gap) between two glass substrates was 9 μm and the twist angle was 80°. Sine waves (0.5 V, 1 kHz) were applied to the device, and after 2 sec, the dielectric constant ∈$_⊥$ in the minor axis direction of the liquid crystal molecules was measured.

7) Threshold voltage (Vth; measured at 25° C.; V): An LCD-5100 luminance meter made by Otsuka Electronics Co., Ltd. was used for the measurement. The light source was a halogen lamp. A sample was put in a normally black mode VA device in which the distance (cell gap) between two glass substrates was 4 μm and a rubbing direction was anti-parallel, and the device was sealed with an UV-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. The threshold voltage was expressed by the voltage at 10% transmittance.

8) Voltage holding ratio (VHR-1; measured at 25° C.; %): A TN device used for the measurement had a polyimide alignment film, and the distance (cell gap) between two glass substrates was 5 μm. A sample was put in the device, and then the device was sealed with an UV-curable adhesive. A pulse voltage (60 μs at 5 V) was applied to the TN device to charge the device. A decaying voltage was measured for 16.7 milliseconds with a high-speed voltmeter, and area A between the voltage curve and the horizontal axis in a unit cycle was determined. The voltage holding ratio was expressed as the percentage of area A to area B that was an area without decay.

9) Voltage holding ratio (VHR-2; measured at 80° C.; %): A voltage holding ratio was measured in a manner similar to the above procedures except that measurement was carried out at 80° C. instead of 25° C. The value obtained was expressed in terms of VHR-2.

10) Voltage holding ratio (VHR-3; measured at 25° C.; %): Stability to UV light was evaluated by measuring a voltage holding ratio after a device was irradiated with UV light. A TN device used for the measurement had a polyimide alignment film, and the cell gap was 5 μm. A sample was injected into the device, and then the device was irradiated with light for 20 min. A light source was an ultra-high-pressure mercury lamp USH-500D (made by Ushio, Inc.), and the distance between the device and the light source was 20 cm. In measuring VHR-3, a decaying voltage was measured for 16.7 milliseconds. A composition having a large VHR-3 has a large stability to UV light. The value of VHR-3 is preferably 90% or more, and further preferably 95% or more.

11) Voltage holding ratio (VHR-4; measured at 25° C.; %): A TN device into which a sample was injected was heated in a constant-temperature bath at 80° C. for 500 hours, and then stability to heat was evaluated by measuring a voltage holding ratio. In measuring VHR-4, a decaying voltage was measured for 16.7 milliseconds. A composition having a large VHR-4 has a large stability to heat.

12) Response time (i; measured at 25° C.; ms): An LCD-5100 luminance meter made by Otsuka Electronics Co., Ltd. was used for the measurement. The light source was a halogen lamp. A low-pass filter was set at 5 kHz. A sample was put in a normally black mode VA device in which the distance (cell gap) between two glass substrates was 4 μm and the rubbing direction was anti-parallel. The device was sealed with an UV-curable adhesive. Rectangular waves (60 Hz, 10 V, 0.5 second) were applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. The response time was expressed in terms of time required for a change from 90% transmittance to 10% transmittance (fall time; millisecond).

13) Specific resistance (ρ; measured at 25° C.; Ω·cm): Into a vessel equipped with electrodes, 1.0 mL of a sample was injected. A DC voltage (10 V) was applied to the vessel, and a DC current after 10 sec was measured. The specific resistance ρ was calculated from the equation "(specific resistance)={(voltage)×(electric capacity of a vessel)}/{(direct current)×(dielectric constant of vacuum)}."

Compounds described in all Examples were expressed using symbols according to definitions in Table 3 below. In Table 3, the configuration of 1,4-cyclohexylene is trans. A parenthesized number next to a symbolized compound corresponds to the number of the compound. The symbol "(-)" means any other liquid crystal compound. The proportion (percentage) of a liquid crystal compound is expressed in terms of weight percentage (wt %) based on the weight of the liquid crystal composition. The values of characteristics of the composition were summarized in the last part.

TABLE 3

Method for Description of Compounds using Symbols
R—(A$_1$)—Z$_1$—...—Z$_n$—(A$_n$)—R'

| 1) Left-terminal Group R— | Symbol |
|---|---|
| FC$_n$H$_{2n}$— | Fn- |
| C$_n$H$_{2n+1}$— | n- |
| C$_n$H$_{2n+1}$O— | nO- |
| C$_m$H$_{2m+1}$OC$_n$H$_{2n}$— | mOn- |
| CH$_2$=CH— | V- |
| C$_n$H$_{2n+1}$—CH=CH— | nV- |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF- |
| CF$_2$=CH—C$_n$H$_{2n}$— | VFFn- |
| CH$_2$=CHCOO— | AC- |
| CH$_2$=C(CH$_3$)COO— | MAC- |

TABLE 3-continued

Method for Description of Compounds using Symbols
R—(A$_1$)—Z$_1$—...—Z$_n$—(A$_n$)—R'

| 2) Right-terminal Group —R' | Symbol |
|---|---|
| —C$_n$H$_{2n+1}$ | -n |
| —OC$_n$H$_{2n+1}$ | -On |
| —CH=CH$_2$ | -V |
| —CH=CH—C$_n$H$_{2n+1}$ | -Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | -VFF |
| —OCOCH=CH$_2$ | -AC |
| —OCOC(CH$_3$)=CH$_2$ | -MAC |

| 3) Bonding Group —Z$_n$— | Symbol |
|---|---|
| —C$_n$H$_{2n}$— | n |
| —COO— | E |
| —CH=CH— | V |
| —CH=CHO— | VO |
| —OCH=CH— | OV |
| —CH$_2$O— | 1O |
| —OCH$_2$— | O1 |

| 4) Ring Structure —A$_n$— | Symbol |
|---|---|
|  | H |
|  | B |
| 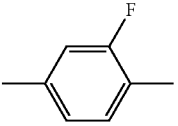 | B(F) |
| 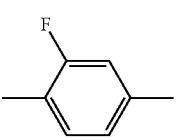 | B(2F) |
| 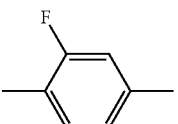 | B(2F,5F) |
| 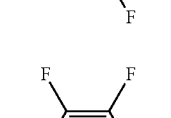 | B(2F,3F) |
| 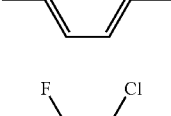 | B(2F,3Cl) |

TABLE 3-continued

Method for Description of Compounds using Symbols
R—(A$_1$)—Z$_1$—...—Z$_n$—(A$_n$)—R'

| | |
|---|---|
| (tetrahydropyran with O at position shown) | dh |
| (tetrahydropyran with O at different position) | Dh |
| (cyclohexene) | ch |
| (difluorochromane structure) | Cro(7F,8F) |

5) Examples of Description

Example 1 V-HDhB(2F,3F)-O2

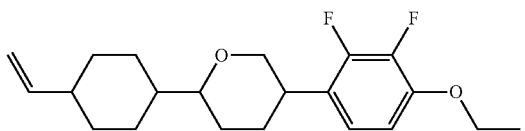 [SMILES: C=CC1CCC(C2CCC(c3ccc(OCC)c(F)c3F)CO2)CC1]

Example 2 5-BB(2F,3F)-O2

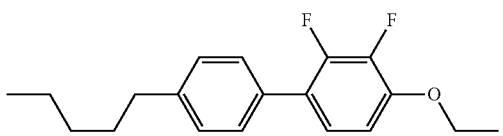

Example 3 HHB-1

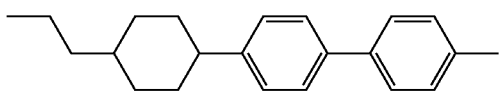 [SMILES: CCCC1CCC(c2ccc(-c3ccc(C)cc3)cc2)CC1]

Example 4 AC-BB-AC

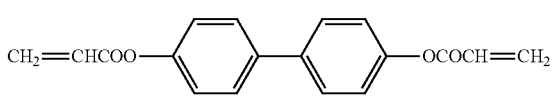

Comparative Example 1

Example 2 was selected from compositions disclosed in WO 2012/53323 A, because the composition contains compounds (1-1), (1-2), (1-3), (2), (3-2) and (3-9). The components and the characteristics of the composition were as described below.

| 1-BB-1 | (3-2) | 5% |
|---|---|---|
| 1-BB-3 | (3-2) | 5% |
| 3-BB-5 | (3-2) | 5% |
| 3-DhHB (2F,3F)-O2 | (—) | 3% |
| V-DhHB (2F,3F)-O2 | (1-1) | 3% |
| 3-HDhB (2F,3F)-O2 | (—) | 7% |
| V2-HDhB (2F,3F)-O2 | (1-2) | 3% |
| 1V2-HDhB (2F,3F)-O2 | (1-2) | 3% |
| V-DhH1OB (2F,3F)-O2 | (—) | 4% |
| 3-DhH1OB (2F,3F)-O2 | (—) | 6% |
| 5-DhH1OB (2F,3F)-O2 | (—) | 5% |
| 3-dhBB (2F,3F)-O2 | (—) | 5% |
| 5-DhB (2F,3F)-O2 | (—) | 5% |
| 3-HH-V | (2) | 23% |
| 3-HH-V1 | (2) | 8% |
| 2-HH-2V1 | (2) | 3% |
| 3-HHEBH-3 | (3-9) | 3% |
| 3-HHEBH-5 | (3-9) | 4% |

NI=83.8° C.; Tc<−20° C.; Δn=0.096; Δ∈=−3.4; η=19.1 mPa·s; VHR-1=99.6%; VHR-2=98.1%; VHR-3=97.9%; γ1=113.4 mPa·s.

Comparative Example 2

Example 5 was selected from compositions disclosed in WO 2011/152494 A, because the composition contains compounds (1), (1-2), (2), (3-1), (3-2), (3-9), (4-4) and (4-8). The components and the characteristics of the composition were as described below.

| 4-BB (2F,3F)-O2 | (4-4) | 3% |
|---|---|---|
| 1V2-BB (2F,3F)-O2 | (4-4) | 5% |
| 5-BB (2F,3F)-1 | (4-4) | 3% |
| 3-HDhB (2F,3F)-O2 | (—) | 5% |
| V-HDhB (2F,3F)-O2 | (1-2) | 3% |
| 3-DhH1OB (2F,3F)-O2 | (—) | 5% |
| 5-DhH1OB (2F,3F)-O2 | (—) | 5% |
| 5-DhBB (2F,3F)-O2 | (—) | 3% |
| 5-HH1OB (2F,3F)-O2 | (4-8) | 8% |
| 3-HH-4 | (2) | 8% |
| 3-HH-V | (2) | 24% |
| 7-HB-1 | (3-1) | 3% |
| V-BB-1 | (3-2) | 8% |
| 1V2-BB-1 | (3-2) | 6% |
| 3-HHEBH-3 | (3-9) | 5% |
| 3-HHEBH-4 | (3-9) | 3% |
| 3-HHEBH-5 | (3-9) | 3% |

NI=89.9° C.; Tc<−20° C.; Δn=0.103; Δ∈=−3.2; η=14.8 mPa·s; VHR-1=98.9%; VHR-2=97.8%; VHR-3=98.1%; γ1=108.3 mPa·s.

Comparative Example 3

Example 13 was selected from compositions disclosed in WO 2008/114821 A, because the composition contains compounds (1-2), (3-4), (3-6), (4-1), (4-8), (4-12) and (4-13). The components and the characteristics of the composition were as described below.

| 3-Dh1OB (2F,3F)-O2 | (—) | 10% |
|---|---|---|
| 5-Dh1OB (2F,3F)-O2 | (—) | 10% |
| V2-HDhB (2F,3F)-O2 | (1-2) | 8% |
| 1V2-HDhB (2F,3F)-O2 | (1-2) | 7% |
| 3-BB (F) B-3 | (3-6) | 5% |
| 5-HBB (F) B-2 | (3-12) | 7% |
| 5-HBB (F) B-3 | (3-12) | 5% |
| 3-HHB-1 | (3-4) | 5% |
| V2-HHB-1 | (3-4) | 5% |
| 3-HB (2F,3F)-O2 | (4-1) | 5% |
| V-HB (2F,3F)-O2 | (4-1) | 8% |
| 5-HHB (2F,3Cl)-O2 | (4-12) | 5% |
| 3-HH1OB (2F,3F)-O2 | (4-8) | 5% |

-continued

| | | |
|---|---|---|
| 5-HH1OB (2F,3F)-O2 | (4-8) | 5% |
| 5-HBB (2F,3Cl)-O2 | (4-13) | 5% |
| V2-HBB (2F,3Cl)-O2 | (4-13) | 5% |

NI=104.7° C.; Tc<−20° C.; Δn=0.124; Δ∈=−5.4; η=43.6 mPa·s; γ1=248.5 mPa·s.

Comparative Example 4

Example 10 was selected from compositions disclosed in WO 2009/157313 A, because the composition contains compounds (1-1), (3-1), (3-2), (3-4), (3-9), (4-2), (4-10) and (4-13). The components and the characteristics of the composition were as described below.

| | | |
|---|---|---|
| V-DhHB (2F,3F)-O2 | (1-1) | 7% |
| 2-BB (F) B-3 | (3-6) | 7% |
| 3-HB-O2 | (3-1) | 3% |
| V2-BB-1 | (3-2) | 14% |
| 3-HHB-1 | (3-4) | 3% |
| 3-HHEBH-4 | (3-9) | 3% |
| 3-H2B (2F,3F)-O2 | (4-2) | 10% |
| 5-H2B (2F,3F)-O2 | (4-2) | 10% |
| V2-HBB (2F,3Cl)-O2 | (4-13) | 8% |
| 2-HBB (2F,3F)-O2 | (4-10) | 10% |
| 3-HBB (2F,3F)-O2 | (4-10) | 5% |
| 4-HBB (2F,3F)-O2 | (4-10) | 10% |
| 5-HBB (2F,3F)-O2 | (4-10) | 10% |

NI=98.3° C.; Δn=0.147; η=30.9 mPa·s; γ1=176.1 mPa·s.

Example 1

| | | |
|---|---|---|
| V-DhHB (2F,3F)-O2 | (1-1) | 9% |
| V-HDhB (2F,3F)-O2 | (1-1) | 4% |
| 3-HH-V | (2) | 30% |
| 3-HH-V1 | (2) | 7% |
| 3-HHB-1 | (3-4) | 5% |
| 3-HB (2F,3F)-O2 | (4-1) | 12% |
| 3-BB (2F,3F)-O2 | (4-4) | 7% |
| 2-HHB (2F,3F)-O2 | (4-6) | 8% |
| 2-BB (2F,3F) B-3 | (4-9) | 8% |
| 2-HBB (2F,3F)-O2 | (4-10) | 2% |
| 3-HBB (2F,3F)-O2 | (4-10) | 8% |

NI=74.5° C.; Tc<−20° C.; Δn=0.100; Δ∈=−3.0; Vth=2.28 V; γ1=98.3 mPa·s.

Example 2

| | | |
|---|---|---|
| V-HDhB (2F,3F)-O2 | (1-2) | 5% |
| 1V2-HDhB (2F,3F)-O2 | (1-2) | 5% |
| 3-HH-V | (2) | 23% |
| 3-HH-V1 | (2) | 8% |
| F3-HH-V | (2) | 3% |
| F3-HH-V1 | (2) | 4% |
| 3-HB-O2 | (3-1) | 3% |
| V-HHB-1 | (3-4) | 5% |
| V2-HHB-1 | (3-4) | 4% |
| V-HB (2F,3F)-O2 | (4-1) | 4% |
| 3-H2B (2F,3F)-O2 | (4-2) | 4% |
| 3-H1OB (2F,3F)-O2 | (4-3) | 7% |
| V-HHB (2F,3F)-O2 | (4-6) | 8% |
| V2-HHB (2F,3F)-O2 | (4-6) | 6% |
| 2-BB (2F,3F) B-3 | (4-9) | 3% |
| 3-HBB (2F,3F)-O2 | (4-10) | 8% |

NI=77.8° C.; Tc<−20° C.; Δn=0.088; Δ∈=−2.5; Vth=2.26 V; γ1=85.5 mPa·s.

Example 3

| | | |
|---|---|---|
| V-HDhB (2F,3F)-O2 | (1-2) | 6% |
| V2-dhBB (2F,3F)-O2 | (1-3) | 5% |
| 5-HH-VFF | (2) | 5% |
| 3-HH-V | (2) | 12% |
| 4-HH-V | (2) | 7% |
| 4-HH-V1 | (2) | 8% |
| 1-BB-3 | (3-2) | 6% |
| 1-BB (F) B-2V | (3-6) | 5% |
| 3-BB (F) B-2V | (3-6) | 5% |
| 3-HB (2F,3F)-O2 | (4-1) | 14% |
| 3-BB (2F,3F)-O2 | (4-4) | 4% |
| 3-HH1OB (2F,3F)-O2 | (4-8) | 6% |
| V-HH1OB (2F,3F)-O2 | (4-8) | 4% |
| 2-HBB (2F,3F)-O2 | (4-10) | 6% |
| V-HBB (2F,3F)-O2 | (4-10) | 4% |
| 3-HHB (2F,3Cl)-O2 | (4-12) | 3% |

NI=71.3° C.; Tc<−20° C.; Δn=0.113; Δ∈=−2.6; Vth=2.28 V; γ1=104.0 mPa·s.

Example 4

| | | |
|---|---|---|
| V-DhHB (2F,3F)-O2 | (1-1) | 9% |
| V2-dhBB (2F,3F)-O2 | (1-3) | 3% |
| 3-HH-V | (2) | 27% |
| 5-HH-V | (2) | 5% |
| 1-BB-5 | (3-2) | 6% |
| VFF-HHB-1 | (3-4) | 3% |
| 3-HBB-2 | (3-5) | 3% |
| 5-HBB (F) B-2 | (3-12) | 3% |
| 3-H1OB (2F,3F)-O2 | (4-3) | 7% |
| V-H1OB (2F,3F)-O2 | (4-3) | 9% |
| 5-B (2F,3F) B (2F,3F)-O2 | (4-5) | 3% |
| 2-HHB (2F,3F)-O2 | (4-6) | 4% |
| 3-HHB (2F,3F)-O2 | (4-6) | 5% |
| 3-HH2B (2F,3F)-O2 | (4-7) | 4% |
| 2-BB (2F,3F) B-3 | (4-9) | 3% |
| 3-HBB (2F,3Cl)-O2 | (4-13) | 3% |
| 1O1-HBBH-5 | (—) | 3% |

NI=74.5° C.; Tc<−20° C.; Δn=0.099; Δ∈=−2.6; Vth=2.28 V; γ1=105.5 mPa·s.

Example 5

| | | |
|---|---|---|
| V-HDhB (2F,3F)-O2 | (1-2) | 5% |
| 1V2-HDhB (2F,3F)-O2 | (1-2) | 5% |
| 3-HH-V | (2) | 25% |
| 1V2-HH-1 | (2) | 3% |
| 1V2-HH-3 | (2) | 5% |
| V2-BB-1 | (3-2) | 3% |
| 3-HHB-1 | (3-4) | 4% |
| 5-B (F) BB-2 | (3-7) | 6% |
| 3-HB(F) HH-2 | (3-8) | 3% |
| V-HB (2F,3F)-O2 | (4-1) | 5% |
| 3-HB (2F,3F)-O2 | (4-1) | 5% |
| 3-H2B (2F,3F)-O2 | (4-2) | 7% |
| 2O-BB (2F,3F)-O2 | (4-4) | 4% |

-continued

| | | |
|---|---|---|
| 2-BB (2F,3F) B-3 | (4-9) | 5% |
| 2-HBB (2F,3F)-O2 | (4-10) | 6% |
| 3-HBB (2F,3F)-O2 | (4-10) | 6% |
| 3-H1OCro (7F,8F)-5 | (4-14) | 3% |

NI=70.1° C.; Tc<−20° C.; Δn=0.108; Δ∈=−2.5; Vth=2.23 V; γ1=104.6 mPa·s.

Example 6

| | | |
|---|---|---|
| V-HDhB (2F,3F)-O2 | (1-2) | 9% |
| V2-HDhB (2F,3F)-O2 | (1-2) | 5% |
| 1V2-HDhB (2F,3F)-O2 | (1-2) | 3% |
| 3-HH-V | (2) | 32% |
| 3-HH-V1 | (2) | 5% |
| 1V2-BB-1 | (3-2) | 5% |
| V-HBB-2 | (3-5) | 3% |
| 3-HHEBH-4 | (3-9) | 3% |
| 3-HHEBH-5 | (3-9) | 3% |
| V2-BB (2F,3F)-O2 | (4-4) | 7% |
| 2-HHB (2F,3F)-O2 | (4-6) | 4% |
| 3-HHB (2F,3F)-O2 | (4-6) | 4% |
| 3-HH1OB (2F,3F)-O2 | (4-8) | 5% |
| V-HH1OB (2F,3F)-O2 | (4-8) | 4% |
| 2-HBB (2F,3F)-O2 | (4-10) | 5% |
| 3-HBB (2F,3F)-O2 | (4-10) | 3% |

NI=93.8° C.; Tc<−20° C.; Δn=0.097; Δ∈=−2.5; Vth=2.30 V; γ1=107.1 mPa·s.

Example 7

| | | |
|---|---|---|
| V-DhHB (2F,3F)-O2 | (1-1) | 7% |
| V-HDhB (2F,3F)-O2 | (1-2) | 7% |
| V-dhBB (2F,3F)-O2 | (1-3) | 6% |
| 3-HH-VFF | (2) | 3% |
| 3-HH-V | (2) | 25% |
| 3-HH-V1 | (2) | 5% |
| 7-HB-1 | (3-1) | 4% |
| 3-HHB-3 | (3-4) | 4% |
| V-HBB-3 | (3-5) | 3% |
| 5-B (F) BB-3 | (3-7) | 5% |
| 5-HBBH-3 | (3-10) | 3% |
| 5-H2B (2F,3F)-O2 | (4-2) | 3% |
| 3-H1OB (2F,3F)-O2 | (4-3) | 6% |
| V-HHB (2F,3F)-O2 | (4-6) | 5% |
| 5-HH2B (2F,3F)-O2 | (4-7) | 3% |
| 2-HH1OB (2F,3F)-O2 | (4-8) | 3% |
| 3-HH1OB (2F,3F)-O2 | (4-8) | 5% |
| 2-BB (2F,3F) B-4 | (4-9) | 3% |

NI=87.3° C.; Tc<−20° C.; Δn=0.098; Δ∈=−2.5; Vth=2.27 V; γ1=106.8 mPa·s.

Example 8

| | | |
|---|---|---|
| V2-HDhB (2F,3F)-O2 | (1-2) | 6% |
| 1V2-HDhB (2F,3F)-O2 | (1-2) | 4% |
| 3-HH-V | (2) | 21% |
| 2-HH-3 | (2) | 12% |
| 3-HH-4 | (2) | 4% |
| 2-BB (F) B-3 | (3-6) | 3% |
| 2-BB (F) B-5 | (3-6) | 4% |
| 5-HB (F) BH-3 | (3-11) | 3% |
| 3-HB (2F,3F)-O2 | (4-1) | 12% |
| V2-BB (2F,3F)-O2 | (4-4) | 8% |

| | | |
|---|---|---|
| 2-HHB (2F,3F)-O2 | (4-6) | 5% |
| 3-HHB (2F,3F)-O2 | (4-6) | 9% |
| 5-HH2B (2F,3F)-O2 | (4-7) | 4% |
| 3-HBB (2F,3F)-O2 | (4-10) | 5% |

NI=74.5° C.; Tc<−20° C.; Δn=0.092; Δ∈=−2.6; Vth=2.26 V; γ1=107.7 mPa·s.

Example 9

| | | |
|---|---|---|
| V2-HDhB (2F,3F)-O2 | (1-2) | 4% |
| 1V2-HDhB (2F,3F)-O2 | (1-2) | 6% |
| 3-HH-V | (2) | 28% |
| 3-HH-V1 | (2) | 5% |
| V2-BB-1 | (3-2) | 4% |
| 3-HHB-1 | (3-4) | 4% |
| 2-BB (F) B-2V | (3-6) | 5% |
| 3-HB (2F,3F)-O2 | (4-1) | 9% |
| 3-BB (2F,3F)-O2 | (4-4) | 7% |
| 2-HHB (2F,3F)-O2 | (4-6) | 6% |
| 2-BB (2F,3F) B-3 | (4-9) | 7% |
| 2-HBB (2F,3F)-O2 | (4-10) | 3% |
| 3-HBB (2F,3F)-O2 | (4-10) | 6% |
| 3-HEB (2F,3F) B (2F,3F)-O2 | (4-11) | 3% |
| 3-HH1OCro (7F,8F)-5 | (4-15) | 3% |

NI=76.0° C.; Tc<−20° C.; Δn=0.112; Δ∈=−2.6; Vth=2.25 V; γ1=106.9 mPa·s.

Example 10

| | | |
|---|---|---|
| V-HDhB (2F,3F)-O2 | (1-2) | 5% |
| V2-HDhB (2F,3F)-O2 | (1-2) | 5% |
| 3-HH-V | (2) | 30% |
| 3-HH-V1 | (2) | 5% |
| 1V2-BB-1 | (3-2) | 3% |
| 3-HHEH-3 | (3-3) | 3% |
| 3-HHB-1 | (3-4) | 3% |
| 3-HB (2F,3F)-O2 | (4-1) | 12% |
| 3-BB (2F,3F)-O2 | (4-4) | 7% |
| 2-HHB (2F,3F)-O2 | (4-6) | 8% |
| 2-BB (2F,3F) B-3 | (4-9) | 7% |
| 2-HBB (2F,3F)-O2 | (4-10) | 5% |
| 3-HBB (2F,3F)-O2 | (4-10) | 7% |

NI=71.5° C.; Tc<−20° C.; Δn=0.101; Δ∈=−2.7; Vth=2.23 V; γ1=98.5 mPa·s.

The compositions in Examples 1 to 10 had viscosity smaller than viscosity of the compositions in Comparative Examples 1 to 4. Therefore, the liquid crystal composition of the invention, which contains the first component and the second component and in which the proportion of the first component is 10 wt % to 40 wt %, is concluded to have further excellent characteristics.

INDUSTRIAL APPLICABILITY

The liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to UV light and a high stability to heat, or has a suitable balance regarding at least two of the characteristics. The LCD device of the invention including such a composition has a short response time, a large voltage holding ratio, a low threshold voltage, a large contrast ratio, a long service life and so forth, and thus can be used for a liquid crystal projector, a liquid crystal television and so forth.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The invention claimed is:

1. A liquid crystal composition that has a negative dielectric anisotropy and contains at least one compound selected from the group of compounds represented by formula (1) as a first component and at least one compound selected from the group of compounds represented by formula (2) as a second component, wherein a proportion of the first component is in a range of 10 wt % to 40 wt % based on a weight of the liquid crystal composition:

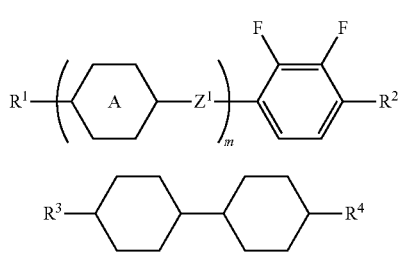

wherein in formula (1) and formula (2), $R^1$ is alkenyl having 2 to 12 carbons; $R^2$ is alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; $R^3$ and $R^4$ are independently alkyl having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; ring A is 1,4-cyclohexylene, 1,4-cyclohexenylene, 1,4-phenylene, 1,4-phenylene in which at least one hydrogen is replaced by fluorine or chlorine, or tetrahydropyran-2,5-diyl, with a proviso that at least one ring A is tetrahydropyran-2,5-diyl; $Z^1$ is a single bond, ethylene or carbonyloxy; and m is 2 or 3.

2. The liquid crystal composition of claim 1, wherein the first component contains at least one compound selected from the group consisting of compounds represented by formula (1-1) to formula (1-3):

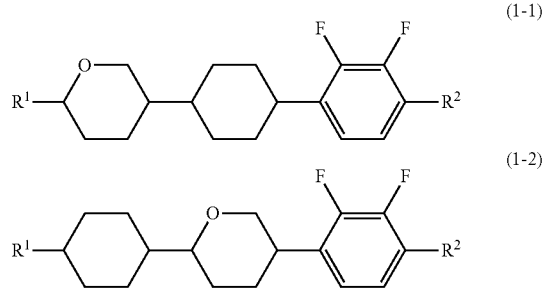

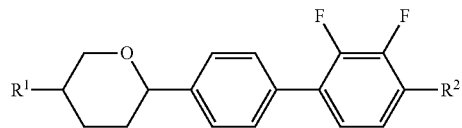

wherein in formula (1-1) to formula (1-3), $R^1$ is alkenyl having 2 to 12 carbons; $R^2$ is alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen.

3. The liquid crystal composition of claim 1, wherein a proportion of the second component is in a range of 10 wt % to 70 wt % based on the weight of the liquid crystal composition.

4. The liquid crystal composition of claim 1, further containing at least one compound selected from the group consisting of compounds represented by formula (3) as a third component:

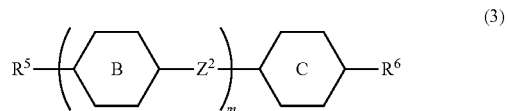

wherein in formula (3), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; n is 1, 2 or 3; and when n is 1, ring C is 1,4-phenylene.

5. The liquid crystal composition of claim 4, wherein the third component contains at least one compound selected from the group consisting of compounds represented by formula (3-1) to formula (3-12):

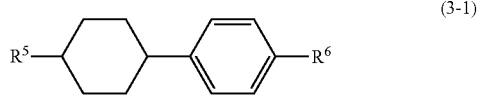

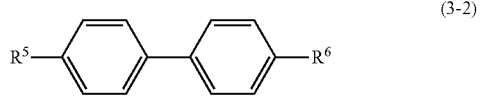

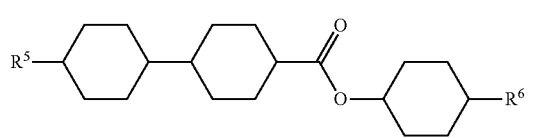

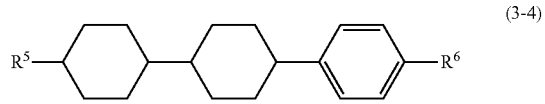

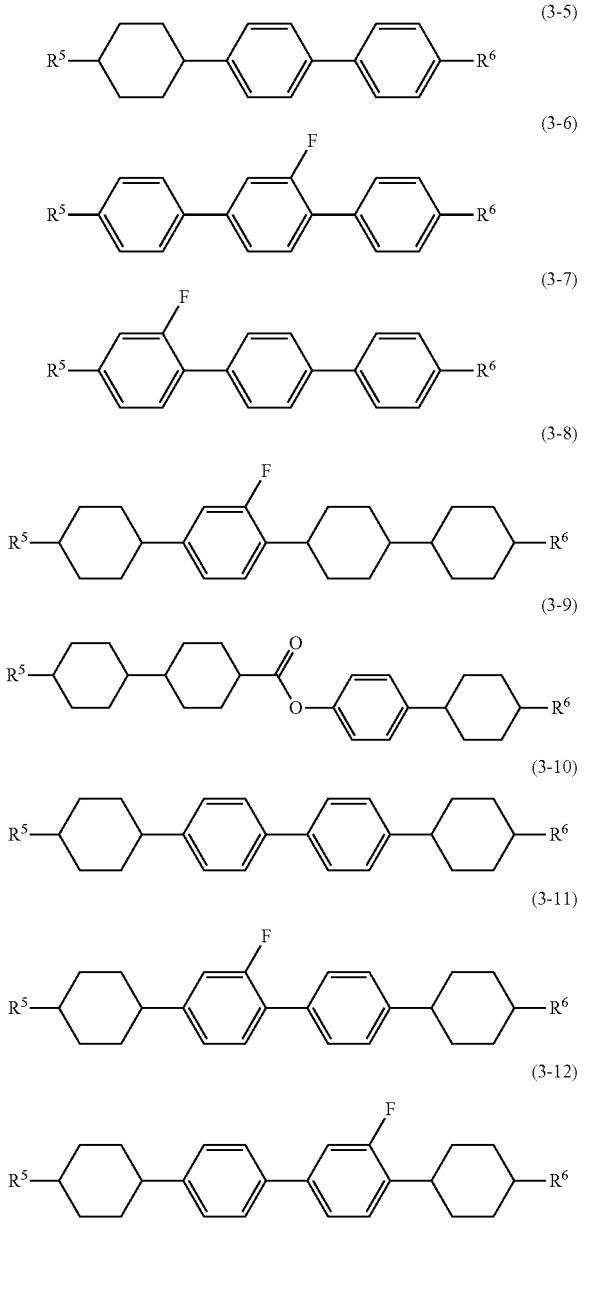

wherein in formula (3-1) to formula (3-12), $R^5$ and $R^6$ are independently alkyl having 1 to 12 carbons, alkoxy having 1 to 12 carbons, alkenyl having 2 to 12 carbons, alkyl having 1 to 12 carbons in which at least one hydrogen is replaced by halogen, or alkenyl having 2 to 12 carbons in which at least one hydrogen is replaced by halogen.

6. The liquid crystal composition of claim 4, wherein a proportion of the third component is in a range of 5 wt % to 50 wt % based on the weight of the liquid crystal composition.

7. The liquid crystal composition of claim 1, further containing at least one compound selected from the group consisting of compounds represented by formula (4) as a fourth component:

wherein in formula (4), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; ring D and ring F are independently 1,4-cyclohexylene, 1,4-cyclohexenylene, 1,4-phenylene, or 1,4-phenylene in which at least one hydrogen is replaced by fluorine or chlorine; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; a is 1, 2 or 3; b is 0 or 1; and a sum of a and b is 3 or less.

8. The liquid crystal composition of claim 7, wherein the fourth component contains at least one compound selected from the group consisting of compounds represented by formula (4-1) to formula (4-15):

-continued (4-7) 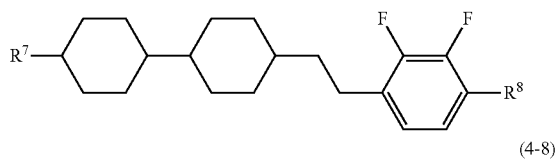

(4-8) 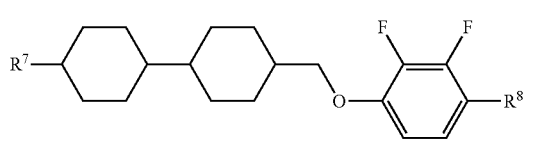

(4-9) 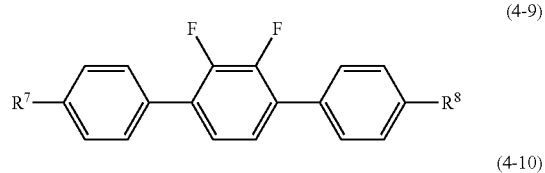

(4-10) 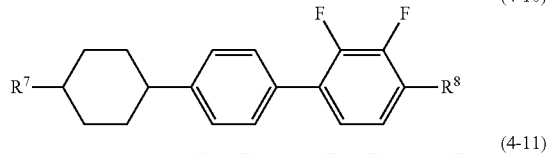

(4-11) 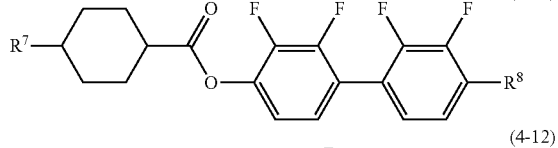

(4-12) 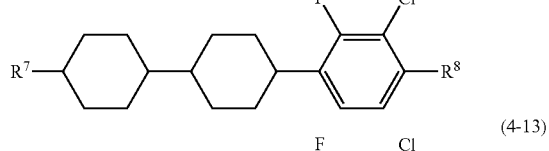

(4-13) 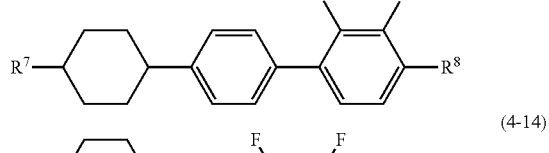

(4-14) 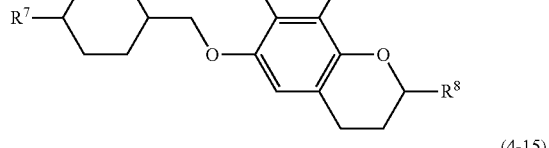

(4-15) 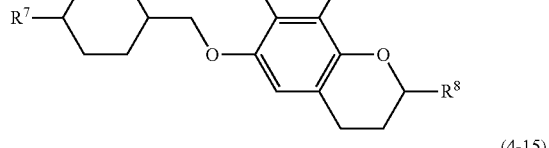

wherein in formula (4-1) to formula (4-15), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen.

9. The liquid crystal composition of claim 7, wherein a proportion of the fourth component is in a range of 15 wt % to 65 wt % based on the weight of the liquid crystal composition.

10. The liquid crystal composition of claim 1, further containing at least one polymerizable compound selected from the group consisting of compounds represented by formula (5) as an additive component:

(5) 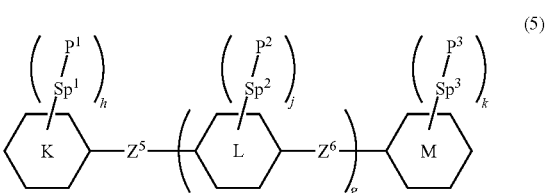

wherein in formula (5), ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^5$ and $Z^6$ are independently a single bond or alkylene having 1 to 10 carbons, and in the alkylene, at least one —$CH_2$— may be replaced by —O—, —CO—, —OCO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are independently a polymerizable group; $Sp^1$, $Sp^2$ and $Sp^a$ are independently a single bond or alkylene having 1 to 10 carbons, and in the alkylene, at least one —$CH_2$— may be replaced by —O—, —OCO—, —OCO— or —OCOO—, at least one —$CH_2$—$CH_2$— may be replaced by —CH=CH— or —C≡C—, and in the groups, at least one hydrogen may be replaced by fluorine or chlorine; g is 0, 1 or 2; h, j and k are independently 0, 1, 2, 3 or 4; and a sum of h, j and k is 1 or more.

11. The liquid crystal composition of claim 10, wherein in formula (5), $P^1$, $P^2$ and $P^3$ are independently a polymerizable group selected from the group consisting of groups represented by formula (P-1) to formula (P-6):

(P-1) 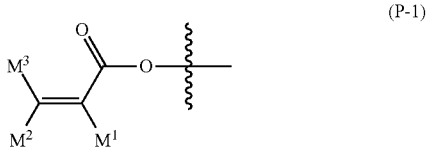

(P-2) 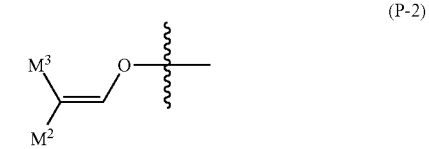

-continued (P-3)
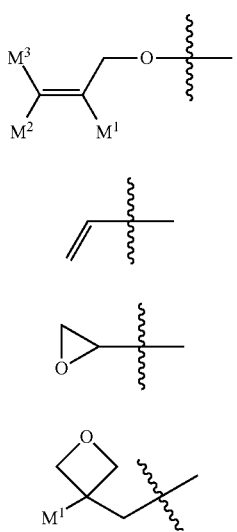

(P-4)

(P-5)

(P-6)

wherein in formula (P-1) to formula (P-6), $M^1$, $M^2$ and $M^3$ are independently hydrogen, fluorine, alkyl having 1 to 5 carbons, or alkyl having 1 to 5 carbons in which at least one hydrogen is replaced by halogen; and in formula (5), when all of the h pieces of $P^1$ and the k pieces of $P^3$ are a group represented by formula (P-4), at least one of the h pieces of $Sp^1$ and the k pieces of $Sp^3$ is alkylene in which at least one —CH$_2$— is replaced by —O—, —COO—, —OCO—, or —OCOO—.

12. The liquid crystal composition of claim 10, wherein the additive component contains at least one polymerizable compound selected from the group consisting of compounds represented by formula (5-1) to formula (5-27):

(5-1)
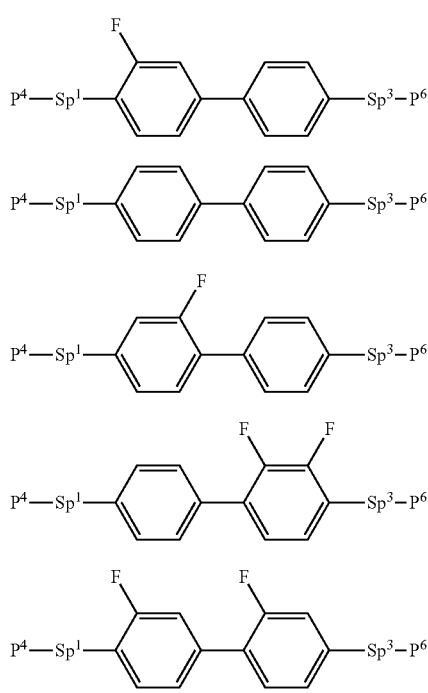

(5-2)

(5-3)

(5-4)

(5-5)

(5-6)
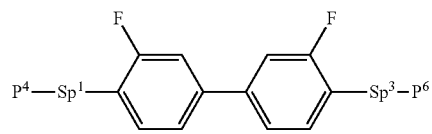

(5-7)
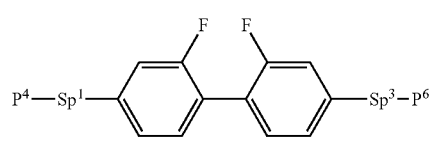

(5-8)
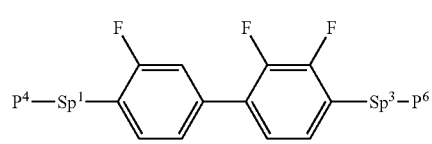

(5-9)
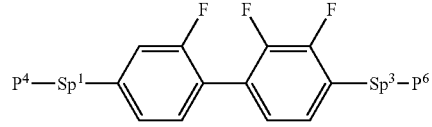

(5-10)
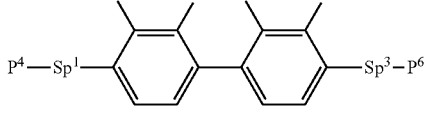

(5-11)
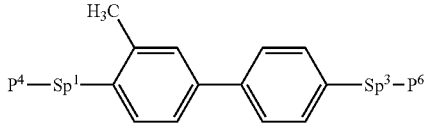

(5-12)
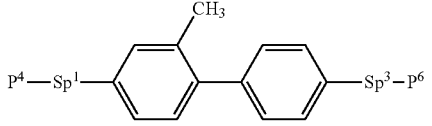

(5-13)
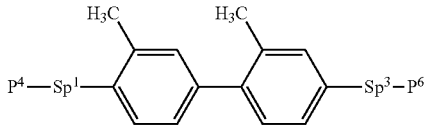

(5-14)
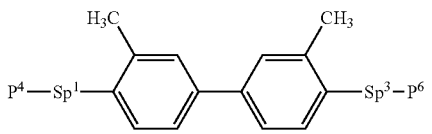

(5-15)
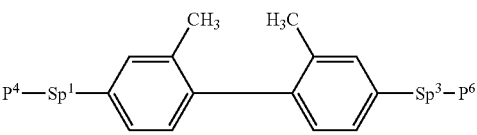

(5-16)
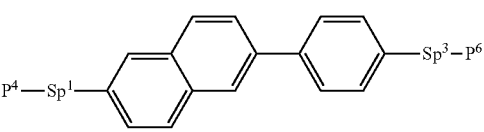

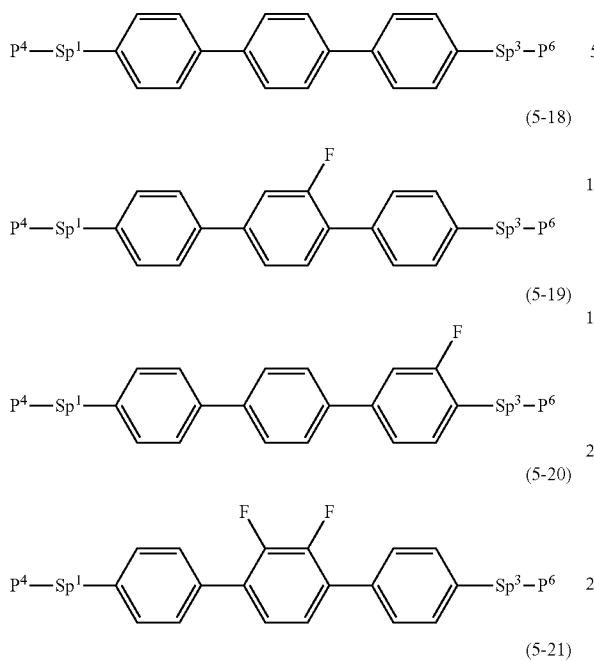

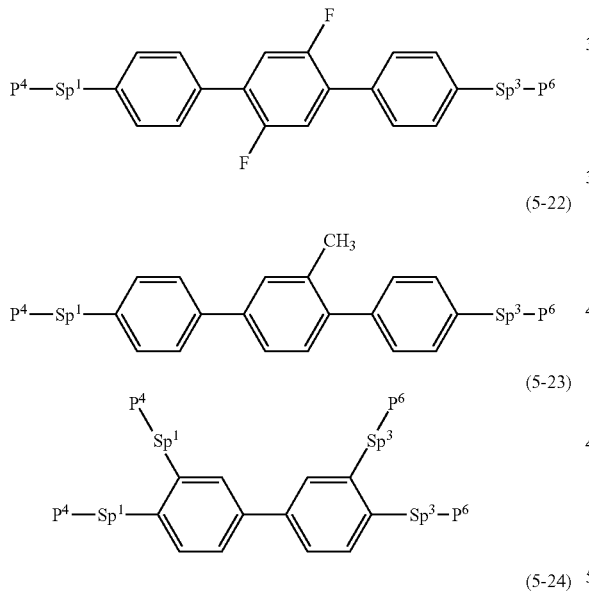

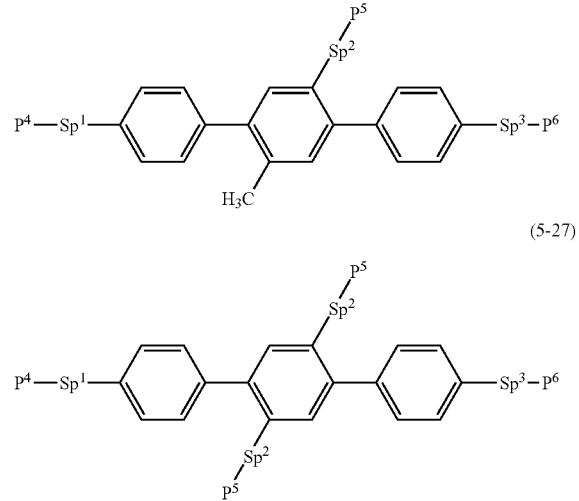

wherein in formula (5-1) to formula (5-27), $P^4$, $P^5$ and $P^6$ are independently a polymerizable group selected from the group consisting of groups represented by formula (P-1) to formula (P-3);

wherein in formula (P-1) to formula (P-3), $M^1$, $M^2$ and $M^3$ are independently hydrogen, fluorine, alkyl having 1 to 5 carbons, or alkyl having 1 to 5 carbons in which at least one hydrogen is replaced by halogen; and in formula (5-1) to formula (5-27), $Sp^1$, $Sp^2$ and $Sp^3$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine.

13. The liquid crystal composition of claim 10, wherein a proportion of addition of the additive component is in a range of 0.03 wt % to 10 wt % based on the weight of the liquid crystal composition.

14. A liquid crystal display device, including the liquid crystal composition of claim 1.

15. The liquid crystal display device of claim 14, of which an operating mode is an IPS mode, a VA mode, an FFS mode or an FPA mode, and a driving mode is an active matrix mode.

16. A polymer sustained alignment (PSA) mode liquid crystal display device, including the liquid crystal composition of claim 10, or a composition obtained by polymerizing the polymerizable compound in the liquid crystal composition of claim 10.

17. The liquid crystal composition of claim 4, further containing at least one compound selected from the group consisting of compounds represented by formula (4) as a fourth component:

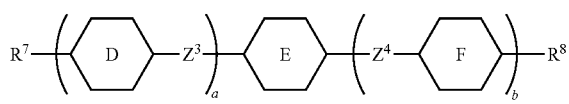
(4)

wherein in formula (4), $R^7$ and $R^8$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by halogen; ring D and ring F are independently 1,4-cyclohexylene, 1,4-cyclohexenylene, 1,4-phenylene, or 1,4-phenylene in which at least one hydrogen is replaced by fluorine or chlorine; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; a is 1, 2 or 3; b is 0 or 1;

and a sum of a and b is 3 or less.

18. The liquid crystal composition of claim 4, further containing at least one polymerizable compound selected from the group consisting of compounds represented by formula (5) as an additive component:

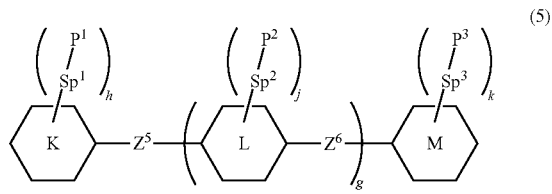
(5)

wherein in formula (5), ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^5$ and $Z^6$ are independently a single bond or alkylene having 1 to 10 carbons, and in the alkylene, at least one —$CH_2$— may be replaced by —O—, —CO—, —OCO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are independently a polymerizable group; $Sp^1$, $Sp^2$ and $Sp^a$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine; g is 0, 1 or 2; h, j and k are independently 0, 1, 2, 3 or 4; and a sum of h, j and k is 1 or more.

19. The liquid crystal composition of claim 17, further containing at least one polymerizable compound selected from the group consisting of compounds represented by formula (5) as an additive component:

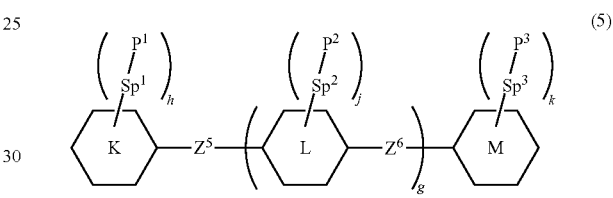
(5)

wherein in formula (5), ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by halogen, alkyl having 1 to 12 carbons, alkoxy having 1 to 12 carbons, or alkyl having 1 to 12 carbons in which at least one hydrogen is replaced by halogen; $Z^5$ and $Z^6$ are independently a single bond or alkylene having 1 to 10 carbons, and in the alkylene, at least one —$CH_2$— may be replaced by —O—, —CO—, —OCO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in the groups, at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one —$CH_2$— may be replaced by —O—, —COO—, —OCO— or —OCOO—, at least one —$CH_2$—$CH_2$— may be replaced by —CH=CH— or —C≡C—, and in the groups, at least one hydrogen may be replaced by fluorine or chlorine; g is 0, 1 or 2; h, j and k are independently 0, 1, 2, 3 or 4; and a sum of h, j and k is 1 or more.

20. A polymer sustained alignment (PSA) mode liquid crystal display device, including the liquid crystal composition of claim 18, or a composition obtained by polymerizing the polymerizable compound in the liquid crystal composition of claim 18.

* * * * *